United States Patent [19]

Rubbright et al.

[11] 4,203,486

[45] May 20, 1980

[54] FOOD PREPARATION APPARATUS AND PROCESS

[75] Inventors: Harry A. Rubbright, Lancaster, Ohio; Donald A. Springer, North Ridge, Calif.

[73] Assignee: Anchor Hocking Corporation, Lancaster, Ohio

[21] Appl. No.: 866,631

[22] Filed: Jan. 3, 1978

Related U.S. Application Data

[62] Division of Ser. No. 758,454, Feb. 21, 1979, abandoned.

[51] Int. Cl.² .......................... F25B 29/00; F24C 7/10
[52] U.S. Cl. .................................. 165/48 R; 165/12; 165/2; 219/386
[58] Field of Search ................... 165/2, 12, 30, 48, 61; 219/386, 387, 400; 312/236; 99/445, 467, 483, 485

[56] References Cited

U.S. PATENT DOCUMENTS

| | | | |
|---|---|---|---|
| 3,180,403 | 4/1965 | Breen | 165/48 |
| 3,199,579 | 8/1965 | Foster et al. | 219/386 |
| 3,666,921 | 5/1972 | Shevlin | 219/386 |
| 3,908,749 | 9/1975 | Williams | 165/2 |
| 3,965,969 | 6/1976 | Williamson | 165/12 |
| 4,019,022 | 4/1977 | Seider et al. | 219/386 |
| 4,052,589 | 10/1977 | Wyatt | 219/386 |
| 4,087,142 | 5/1978 | Aumack | 165/61 |

FOREIGN PATENT DOCUMENTS

342930  5/1920  Fed. Rep. of Germany ............ 165/61

Primary Examiner—Ronald H. Lazarus
Assistant Examiner—P. S. Lall
Attorney, Agent, or Firm—Connolly and Hutz

[57] ABSTRACT

A portable cart with access doors has serving trays supported on heater shelves which trays support the food items to be served to the patient. Chilled air for the cart is provided by an air chilling device to a plenum chamber which chamber when coupled continuously circulates chilled air from the chilled air device into and through the cart and then back through the plenum chamber to the chilled air device in a continuous closed loop pattern. The circulating air passes through mating vents and inlets of the plenum chamber and the cart which automatically open when the cart is coupled with the plenum chamber. The heating for each food item to be served hot is initiated, time controlled and terminated by a programmed computer which separately controls the operation of the individual heater plates mounted on the heater shelves supporting the trays. The food carts can be initially connected to mating plenum chambers in the food preparation area, then removed and sent to designated areas of the hospital, for instance, where they are positioned into plenum chambers having a control unit at which area a computer control unit takes over and initiates the cooking of those foods to be served hot.

33 Claims, 28 Drawing Figures

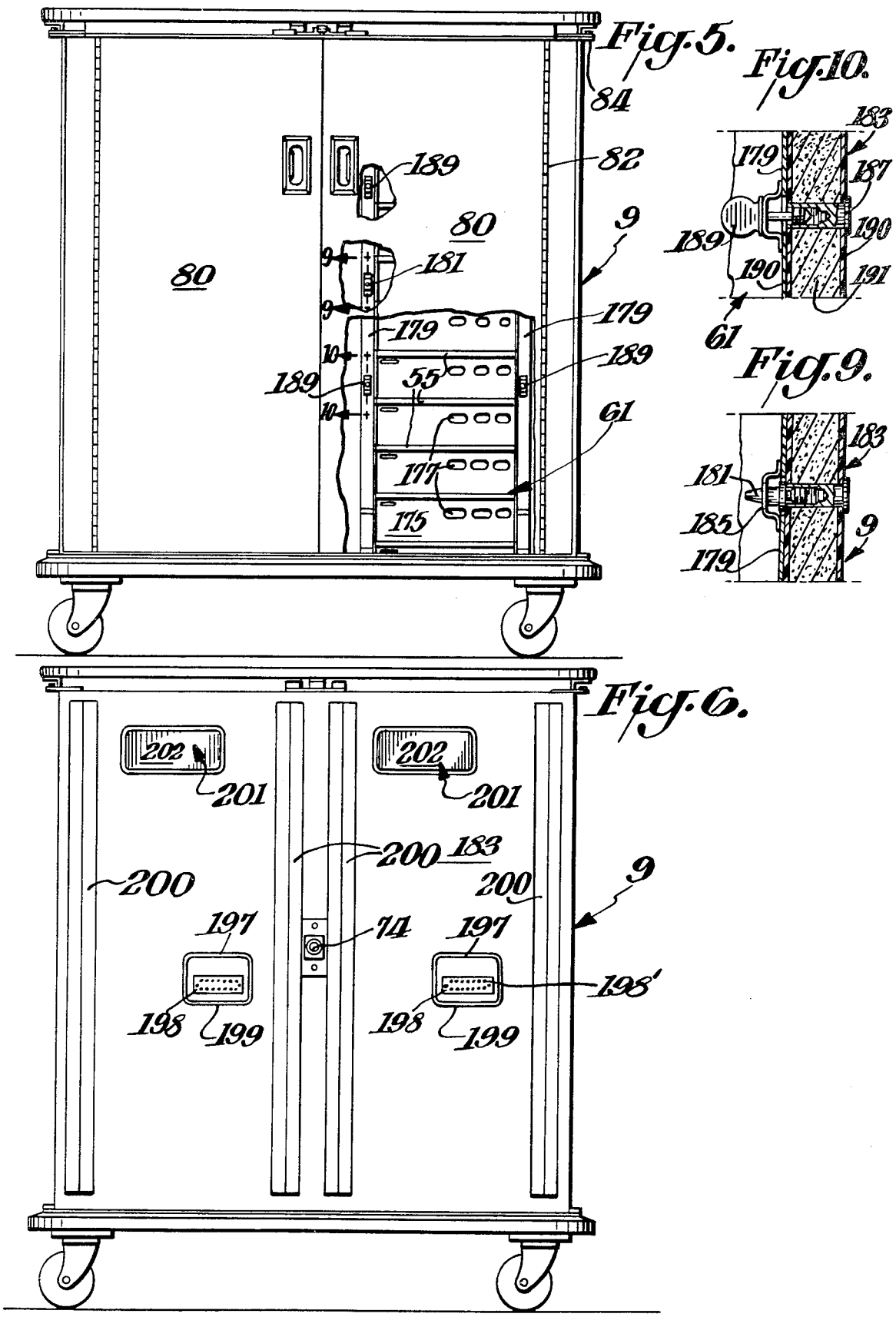

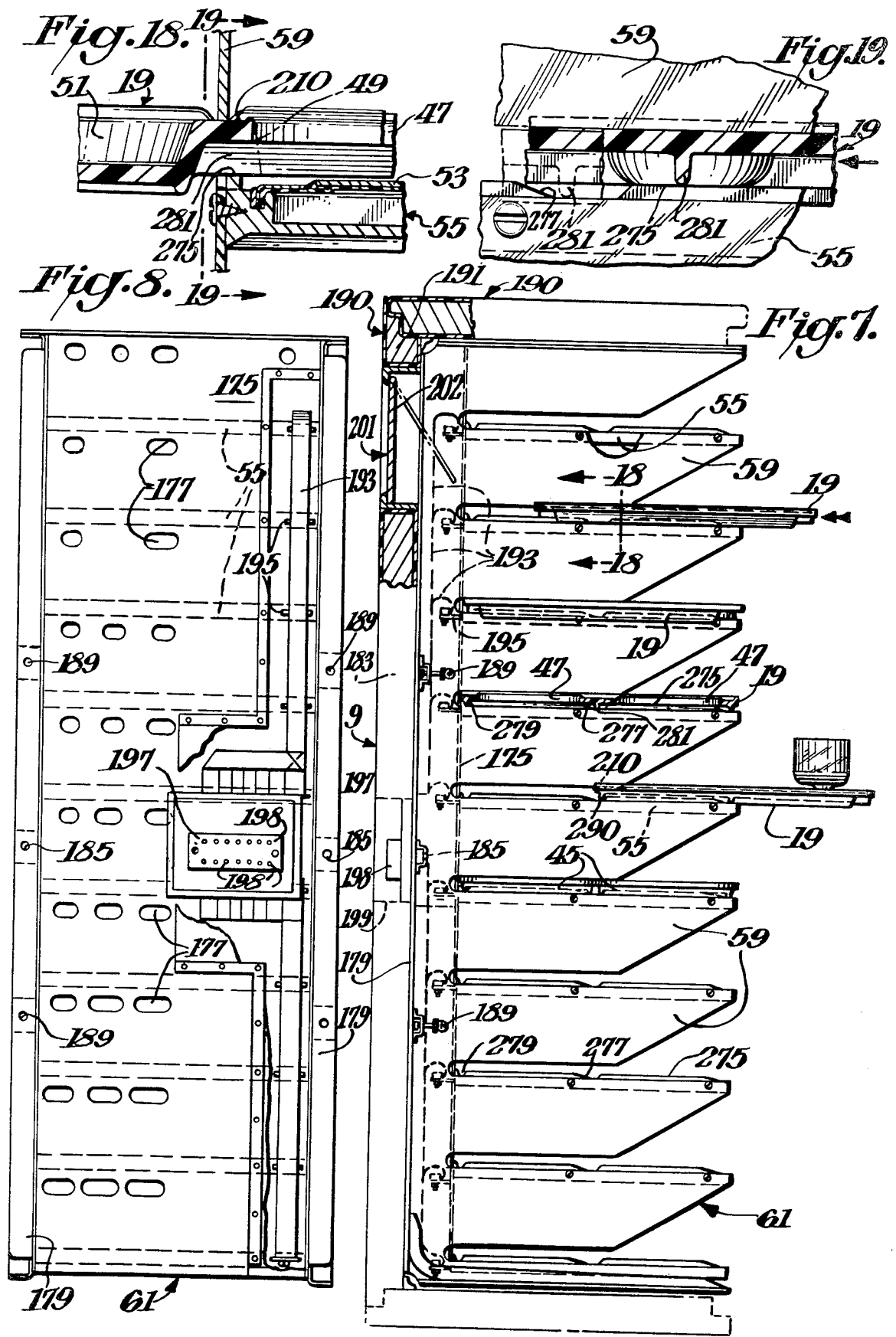

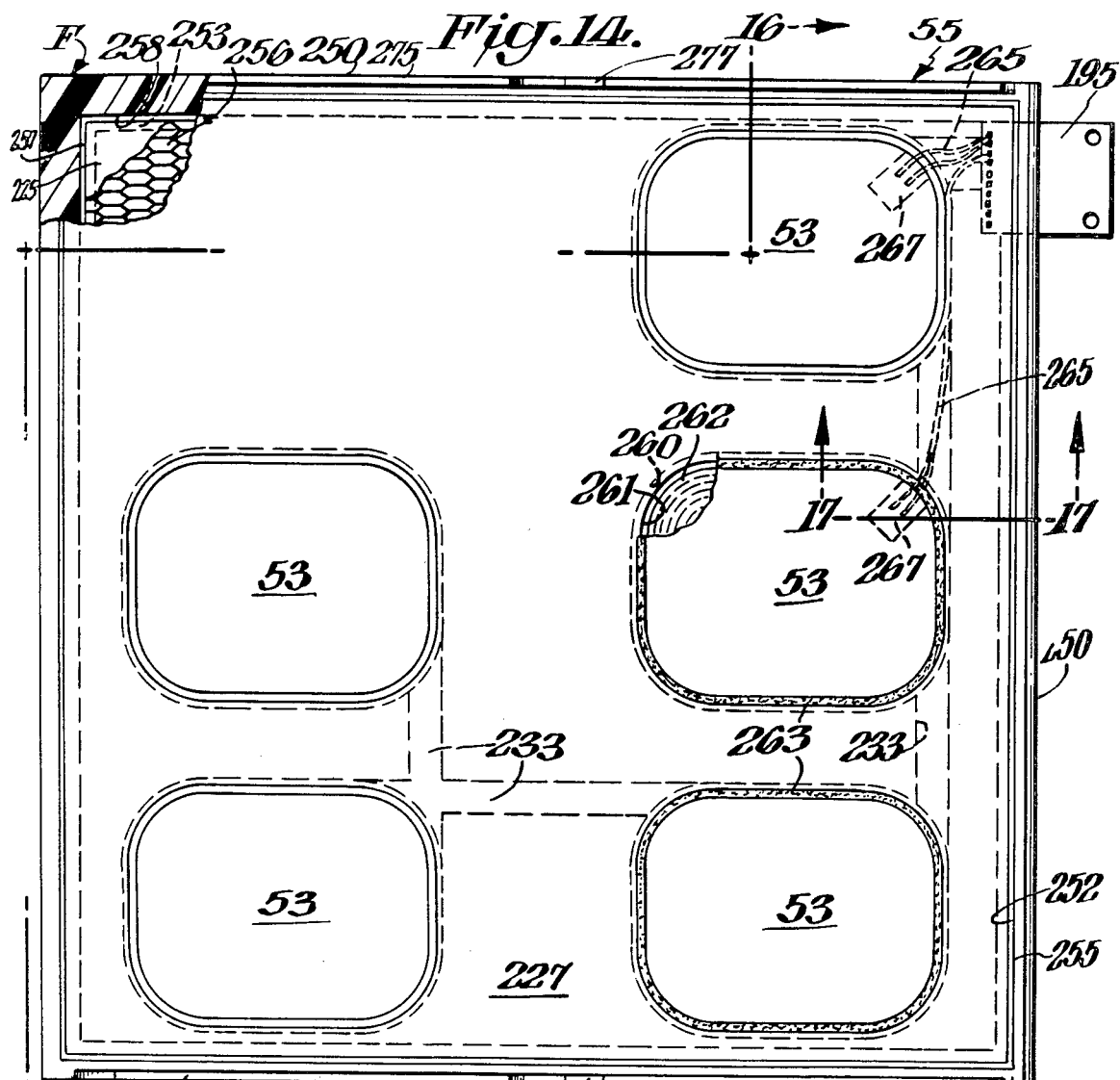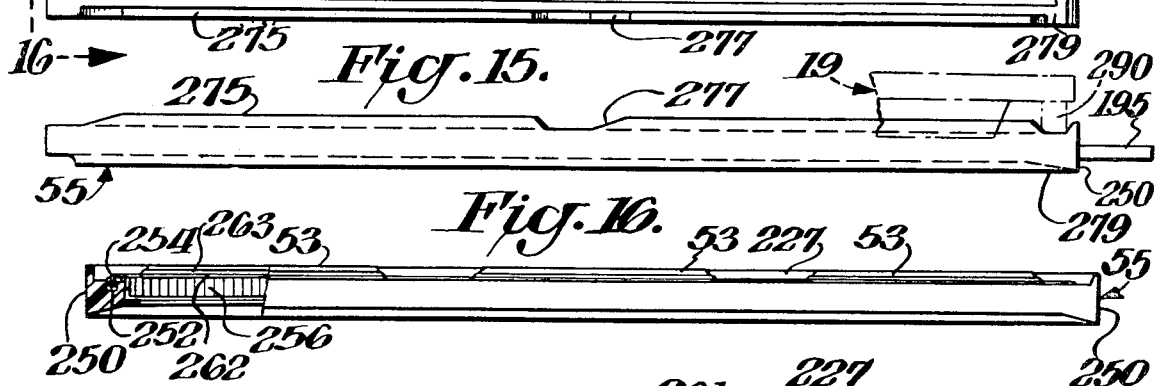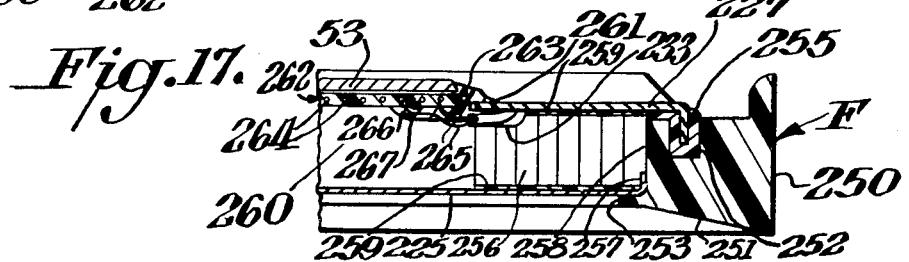

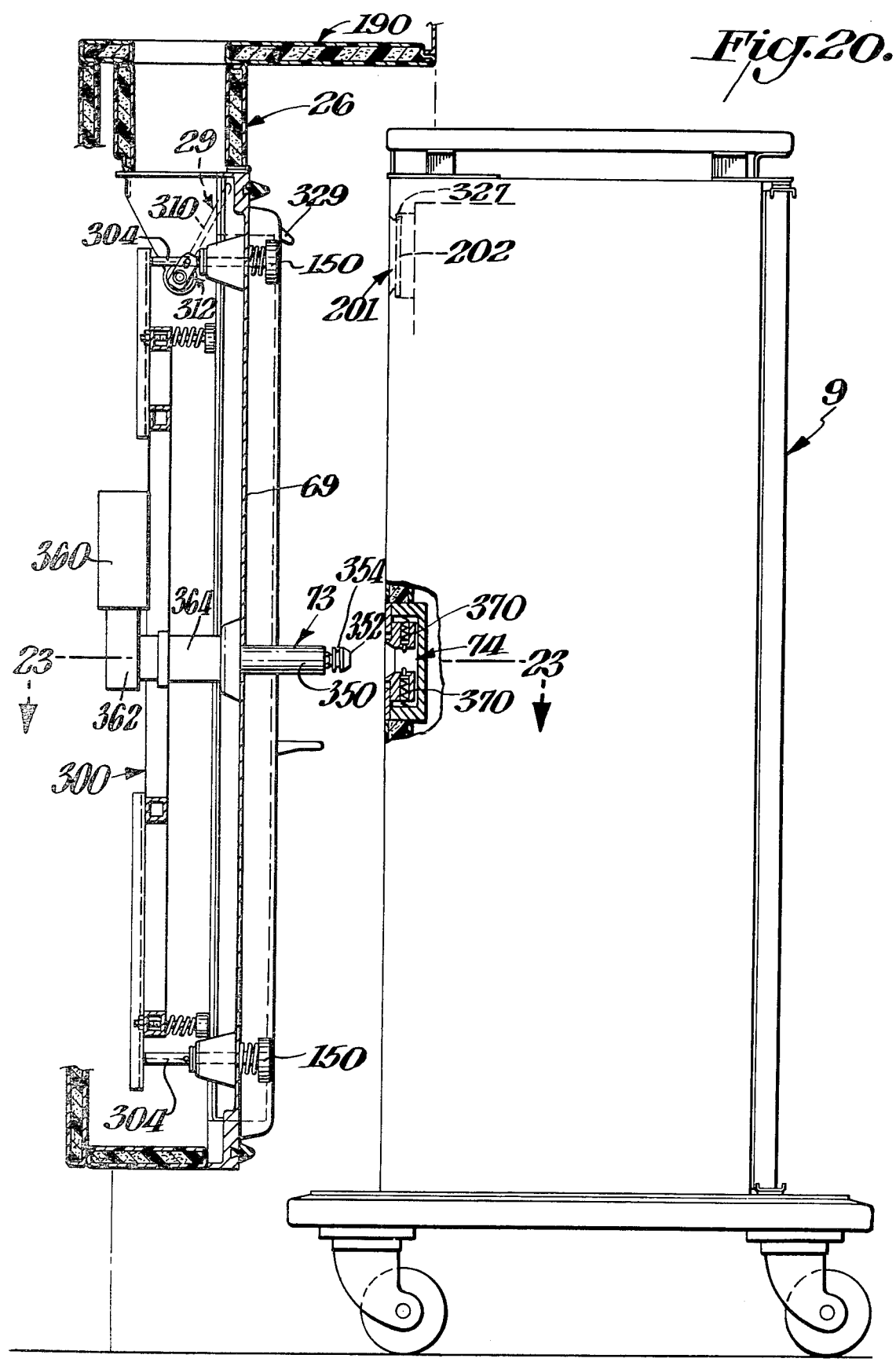

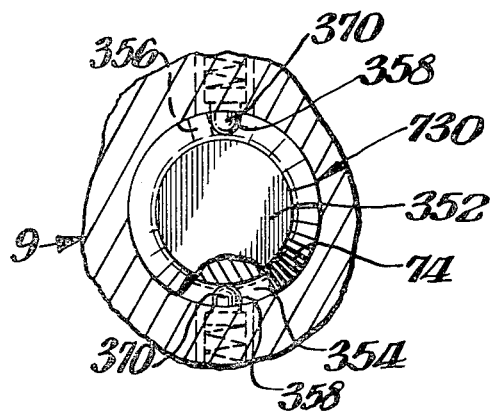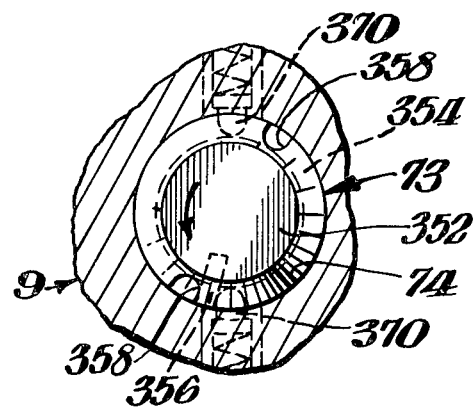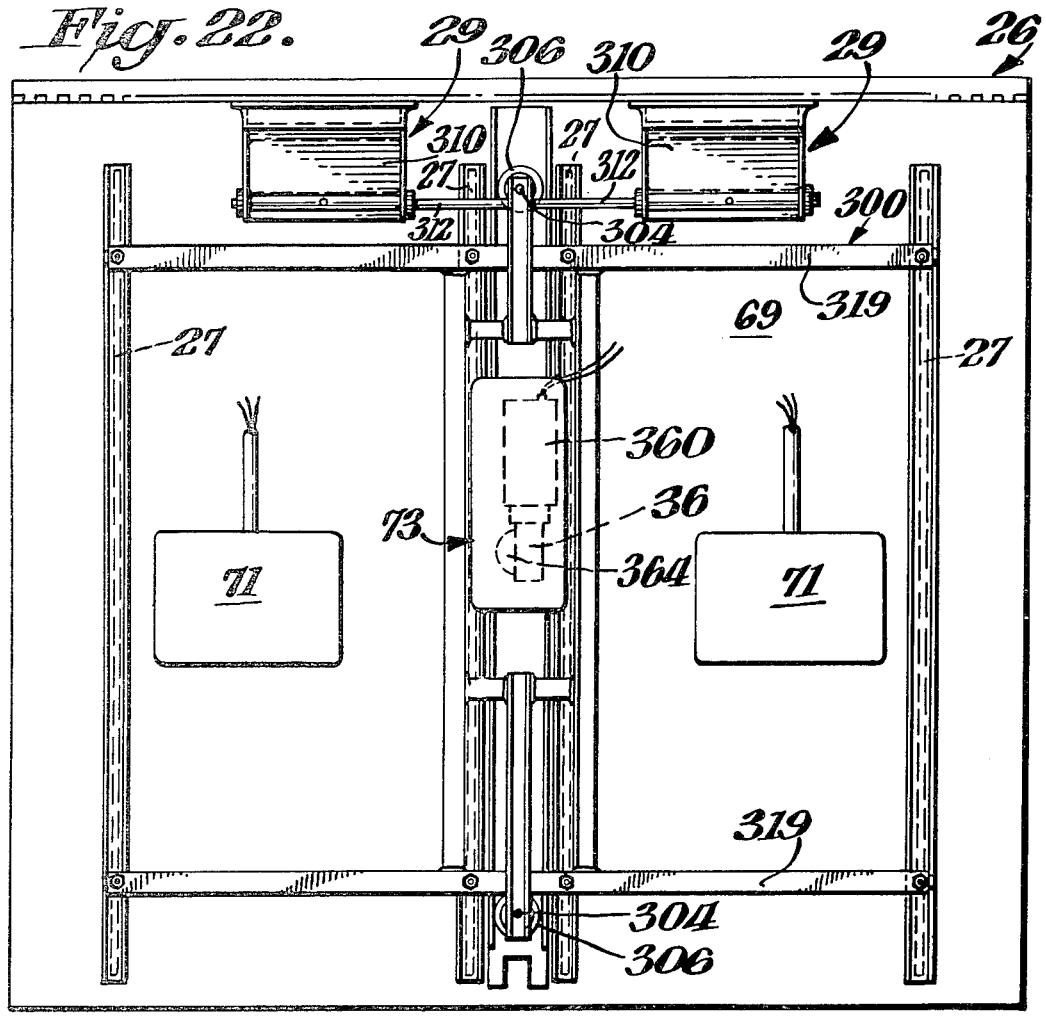

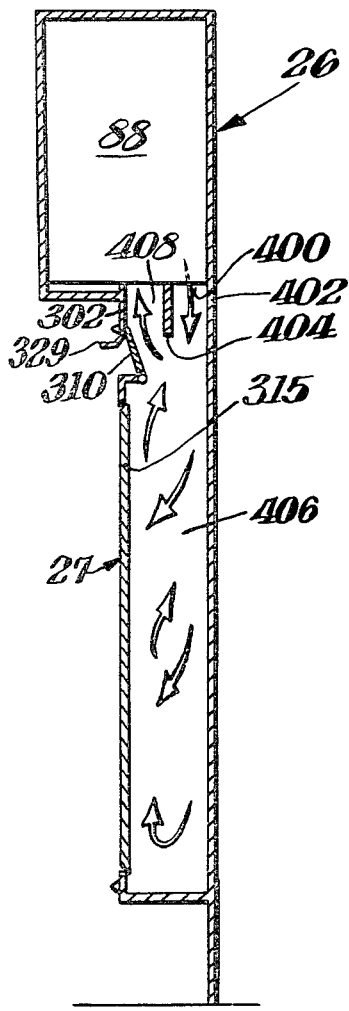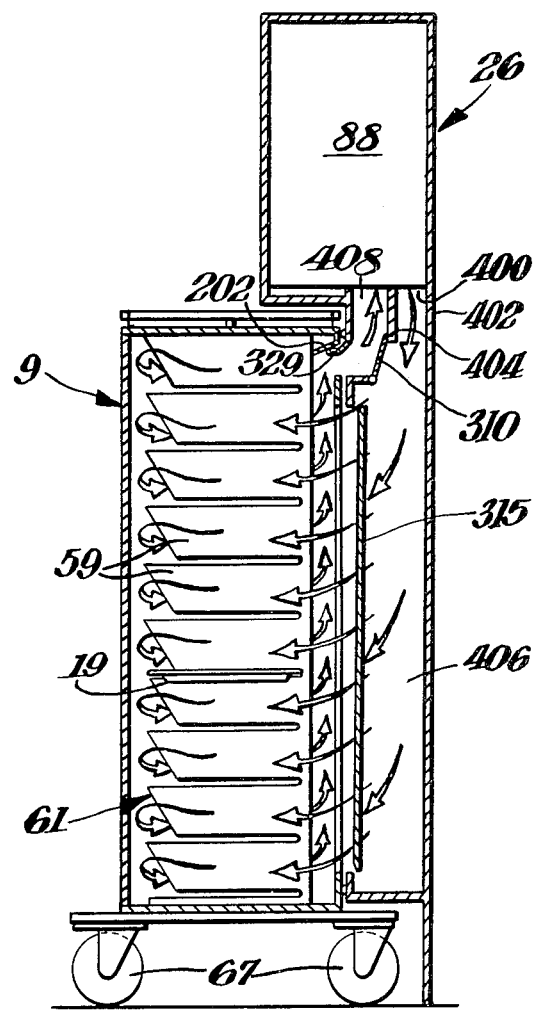

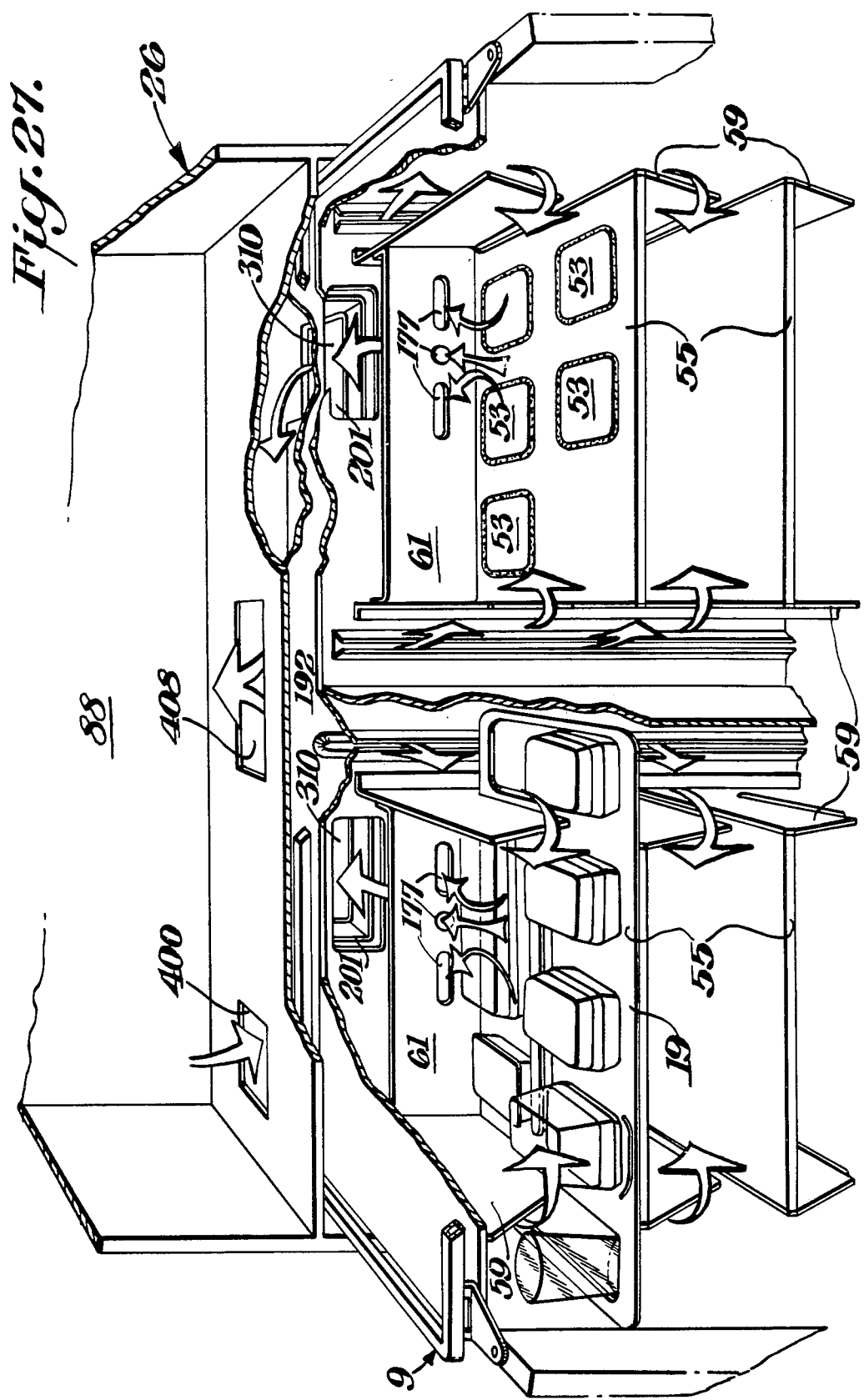

FOOD PREPARATION APPARATUS AND PROCESS

CROSS REFERENCE

This application is a divisional of Ser. No. 758,454, now abandoned, Feb. 21, 1979.

BACKGROUND OF THE INVENTION

The present invention relates to a food preparation apparatus. Relating U.S. patents and patent applications are U.S. Pat. No. 4,005,745 issued Feb. 1, 1977; Ser. No. 707,048 abandoned filed July 20, 1976; Ser. No. 710,697 U.S. Pat. No. 4,103,736 filed Aug. 2, 1976; Ser. No. 758,454 abandoned filed Jan. 11, 1977 and Ser. No. 775,768 U.S. Pat. No. 4,087,142 filed Mar. 9, 1977.

There has existed for a long time a need for an efficient easy to operate food preparation apparatus which prepares nutritional and appetizing meals for hospital patients and other institutional patients, airline passengers, as well as for groups of people such as field or factory workers who are isolated from restaurants or food dispensing outlets.

Needless to say, a great deal of work has been done in this area in an attempt to achieve an acceptable and satisfactory food preparation system. However, they all have serious disadvantages or are not sufficiently sophisticated to accomplish the many aspects required by a system or apparatus for producing nutritional, wholesome, appetizing meals. Some of these known devices require separate insulated cabinets in which hot and cold foods are separately confined. To assemble a meal the attendant must select hot dishes from one compartment and cold dishes from the other and place them on a suitable tray. This is time consuming and could lead to mistakes in the required menu. Another system allows for fully assembled meal trays but has no provision for reheating or cold maintenance of the food and simply stores the food in an insulated unit. Food stored in such a manner can maintain hot food hot and the cold food cold only for a limited time.

Another system provides insulated dishes with integral heaters for heating and holding the hot portions of the meal. In certain of these systems the dish, after it has been heated in a separate unit must be assembled on a tray containing the chilled portions of the meal. In other systems, the food to be heated and the chilled food items are assembled on a single tray within a refrigerated unit, and electrical connections on the dish must mate with connections on the tray which makes connections with the unit. The dish is then surrounded by air insulated barrier which blocks off the chilled air from the heated dishes. Flavor and nutritional values are readily destroyed with such a system.

In certain of the known systems wherein both food items to be served hot and cold are stored on a single tray and the cumbersome insulated integral heating dishes are used, the attendant must come along at the proper time and press certain buttons to initiate the heating process and then must be required to manually terminate the heating after the items are cooked. This is extremely disadvantageous knowing that different foods to be cooked require different heating times and temperatures.

In addition to the prior art cited or brought to the Examiner's attention in the above three noted patent applications the following art was considered with respect to the present invention U.S. Pat. Nos.: 3,908,749, 2,198,239, 3,156,102, 3,392,943, 3,872,686, 3,814,492, 2,778,206, 3,707,317, 2,872,792, 3,752,640, 2,439,487, 3,924,100, 3,836,220, 3,632,968, 2,634,589, 3,895,215, 3,255,812, 3,366,432, 2,914,927, 3,261,650, 2,568,493, 3,969,969, 2,293,316.

SUMMARY OF THE INVENTION

In summary, the present invention includes as environmental control unit (hereafter called ECU) which is a permanently stationed unit. These units are of two types and typically located in food preparation areas such as the kitchen (KECU), or in strategically located food areas or floors where the meal recipients are located (FECU). Both the KECU and the FECU include means for providing a chilled circulating stream of air in a closed loop pattern within the plenum chamber of the ECUs. The front or face of both types of the ECUs include elongated vertical air outlets which are normally closed but which automatically open when a portable food-beverage transporter (hereafter FBT) is coupled to the ECU permitting the chilled air stream circulating within the ECU to circulate through the interior of the FBT via corresponding gasketed air inlets in the back wall of the FBT which are automatically opened when the FBT is coupled to the ECU. The ECU face also includes air return ports which are normally closed but which automatically open when the FBT and ECU are coupled to return and recirculate the chilled air to the air chilling device after it has been discharged through mating outlet ports on the back wall of the FBT which are likewise automatically opened when the FBT is coupled with the ECU.

Once the FBT is moved to a position within several inches of the face of the ECU a mechanism extending through the front panel of the ECU is actuated and extends toward the back panel of the FBT to connect with a mating element in the rear wall of the FBT and automatically retracts to pull the FBT tightly up against the face of the ECU to couple them together.

Both the ECU and the FBT are constructed of insulated sections of "pultruded" fiberglass panels which will be described later. The FBT provides for the containment of one or two heater shelf racks with cantilevered supports which in turn support in a one above the other relationship heater shelves upon which the trays are placed. Each tray may contain both food to be heated and food to be served cold. Electrical connections from the back of each heater shelf are gathered together at a plug located at the back wall of the heater shelf rack which automatically mates with a power source plug located in the front panel of the FECU during the coupling operation of the FBT and FECU. The heater shelf contains a series of strategically spaced potentially raised heater elements located under the slightly raised portions of the surface of the heater shelf itself. The serving trays upon which the food is supported contain a plurality of dish holes or openings through the tray surface which holes correspond in position to that of the raised heater elements of the heater shelf when the tray is positioned on the heater shelf. Dishes containing food to be heated or cooked are supported within the holes or openings in the trays whereby when the trays are in position within the heater shelf rack the bottom of the dishes to be heated contact the raised heater elements of the heater shelf and are moved out of contact with the edge of the openings in the trays which normally support the dishes to be heated thus preventing heat transfer from the dish during the heating process to the tray itself. The raised heater elements do not contact the tray when the tray is positioned on the heater shelf.

Externally located to the FECU is a transport command unit (hereafter TCU) which is programmed by a transport modular pack (hereafter TMP) to automatically perform the time/temperature curves of the heater elements in the FBTs. The TMP consists of a volitile memory into which the time/temperature curves for the individual heater element are selected. When placed into the TCU the TMP instructs the TCU to provide the programmed time/temperature curves for the selected heater elements in the heater shelves. The time/temperature curves for each heater element may be the same, or different depending on the item placed within the dish to be heated. The variables of food density, weight, and configuration are accounted for.

Once the food trays are prepared and positioned onto the heater shelf racks within the FBT, the FBT may be coupled to an KECU whereby, chilling of all the dishes supported on the tray including those to be heated automatically commences. If desired, the chilled FBTs can be transported to other areas by suitable monorail systems, lift systems, by manual means or the like. Upon arrival at the desired floor, station, cottage, or the like the FBT is ready for connection with an FECU. The coupling operation of the FECU and FBT will not occur until the transport module pack (hereafter TMP) which accompanies the FBT has been inserted into a proper receptacle of the TCU which automatically operates means for coupling the FECU and FBT. At a predetermined time, the programmed TCU turns on the specific heater elements to heat the dishes to be served hot for the desired time and temperature curves as selected. The chilling of the FBT is continued throughout the heating cycle which cools the noninsulated walls of the dishes being heated as well as the noninsulated lids or covers therefor which provides more nutritious and tasty food as explained in copending application Ser. No. 710,697 filed Aug. 2, 1976. When the meals are ready for serving, one merely opens the FBT door and pulls out the desired tray or trays containing the required hot and cold food items for subsequent delivery. The TCU will begin the heating program automatically at the desired time. If required or desired, the heating program can be delayed or the individual time/temperature curves can be revised.

In food preparation center or kitchen, there can be a quantity of KECUs which accommodate the FBTs for chilled maintenance only after they have been loaded with the serving trays containing food items. Once all of the FBTs have been loaded and connected with the KECUs the individual FBTs may be released from the chilled maintenance and sent to the proper FECU having an attached TCU, via the various means mentioned above.

DESCRIPTION OF DRAWINGS

FIG. 5 is a front elevation of the FBT with a portion broken away to illustrate the support rack for the serving trays and the heater shelves.

FIG. 6 is a rear elevation of the FBT shown in FIG. 5.

FIG. 7 is a side elevation of the heater shelf rack illustrating serving trays in various positions.

FIG. 8 is a rear elevation of the heater shelf rack shown in FIG. 7 illustrating the electrical connector, for the heater shelves, and the air circulation vents.

FIG. 9 is a section taken along line 9—9 of FIG. 5 illustrating the means for aligning the heater shelf rack within the FBT.

FIG. 10 is a section taken along line 10—10 of FIG. 5 illustrating the means for anchoring the heater shelf rack to the FBT.

FIG. 14 is a top view of a heater shelf with portions broken away.

FIG. 15 is a side elevation of the heater shelf of FIG. 14.

FIG. 16 is a section taken along line 16—16 of FIG. 14.

FIG. 17 is a section taken along line 17—17 of FIG. 14.

FIG. 18 is a fragmental section taken along line 18—18 of FIG. 7 illustrating a serving tray sliding into position along the heater shelf rack.

FIG. 19 is a fragmental section taken along line 19—19 of FIG. 18.

FIG. 20 is a side elevation in section illustrating the FBT in uncoupled position with respect to the ECU.

FIGS. 21A and B illustrate means for coupling the ECU and FBT.

FIG. 22 is a rear elevation of the ECU illustrating the control frame.

FIG. 25 is a schematic illustrating the refrigerated air loop circulation pattern in the ECU prior to coupling with the FBT.

FIG. 26 is a schematic illustrating the refrigerated air loop circulation pattern through the ECU and FBT in coupled position.

FIG. 27 is another schematic illustrating the refrigerated air loop circulation pattern through the ECU and FBT when in coupled position.

DESCRIPTION OF THE INVENTION

Figure 1:
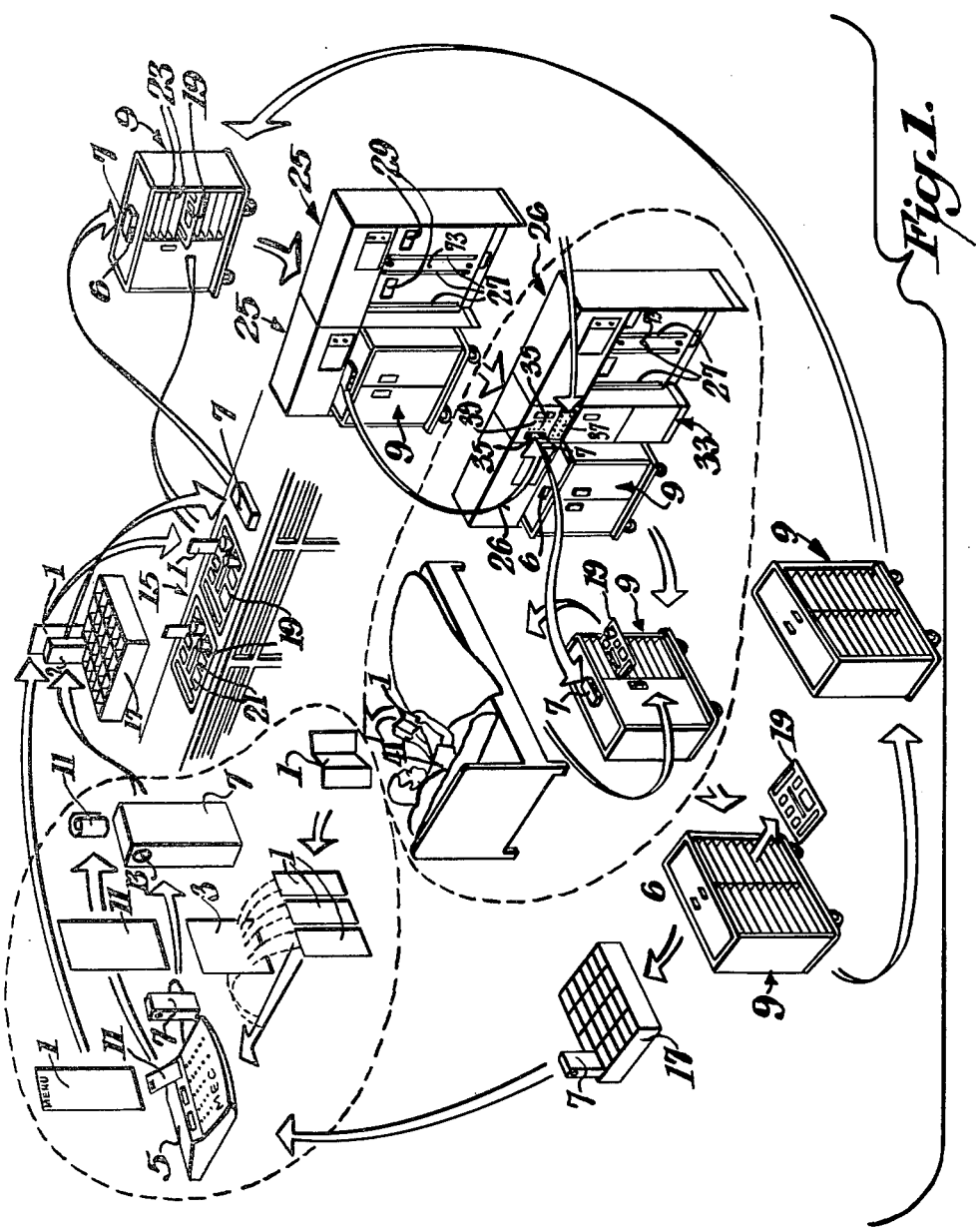
FIG. 1 is a diagramatic view of the present invention and includes the KECU.

The present invention is shown diagramatically in FIG. 1 of the drawings. As seen therein, menus 1 set forth a patient's food selection for the day including breakfast, lunch and dinner. A coding chart 3 is used by the operator to translate the food items selected on the menus 1 into a series of numerical codes which are representative of time/temperature curves.

A master entry console (MEC) 5 which is a programmable electronic calculator unit translates the numeric codes into binary codes. The MEC program format consists of a questionanswer approach. Communication between the MEC and operator consist of a question and answer approach. The MEC asks the question based on the key actuated and the operator answers the request by performing a specific function. The MEC 5 can input into the transport module pack (hereafter TMP) 7 a cart destination code, meal code, date code and heater time/temperature curve code. The TMP 7 consists of a bit random access memory device powered by a small alkaline battery and enclosed in a plastic enclosure. The TCU 33 translates the codes within the TMP 7 into its main computer memory for controlling the heater elements in the FBT 9 for cooking and/or heating the food items to be served hot. Potentially there are 100 such heater elements within the FBT 9. The MEC 5 also produces a printed paper record 11 for each TMP. This document or record 11 contains pertinent printed data in regard to the heater element settings within the FBT 9, tray quantities, meal and date, and FBT destination code. The record 11 is rolled up and inserted in an opening 13 in the side of the TMP 7. In addition, the MEC 5 also permits the operator to perform a diagnostic check of the heater element within the FBT 9 to insure that all the heater elements are operational within preprescribed limits.

The prescribed meal menu along with the TMP 7 including the printed record 11 are then transported to the food tray assembly station 15 in the module transport box (MTB) 17.

At the food tray assembly station 15, food handling personnel with the use of the menu 1 selects the proper food and beverages to be served hot and locates them on the patient's tray 19. The printed record 11 is used at all times to verify which time/temperature curve to be used for each heater element. The trays 19 are then positioned on pre-assigned heater shelves 23 of the FBT 9 The TMP 7 with its predetermined destination code is secured by clip 6 on top of the FBT 9 and accompanies the FBT 9. Details of the heater shelves 23, the trays 19 and the FBT will be explained at a later point in the specification.

The FBT 9 loaded with trays 19 supporting food items is then moved to a KECU 25 and coupled therewith as shown in the drawing. The KECU 25 is a unit which has means to circulate chilled air at approximately 40° F. to the FBT 9 through normally closed air outlets 27 and back through normally closed inlets 29 of the KECU. The inlets and outlets are automatically opened when the FBT 9 is coupled with the KECU 25 which operation will be explained in greater detail hereinafter. The KECU 25 is installed in mutliples in the kitchen or food preparation area and they have a common remote compressor/condenser unit or similar means for providing refrigeration of the circulating air. The KECU 25 does not have the electrical capability to heat the food within FBT 9.

The FBTs 9 are maintained in chilled condition until their scheduled distribution. They are then transferred to the desired floor by monorail systems, suitable elevator lift systems, or other known means (not shown) for effecting such transportation.

Figure 4:
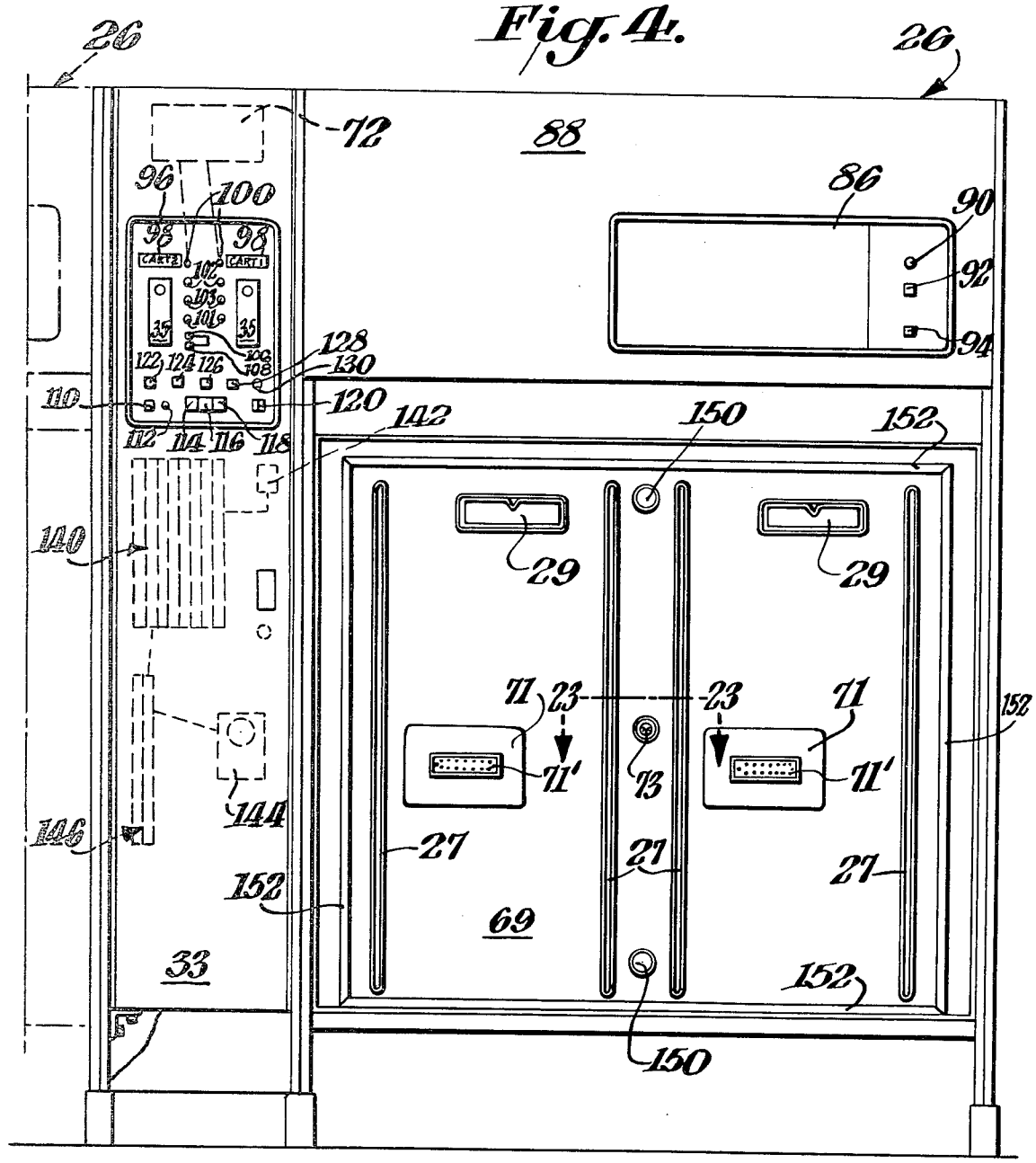
FIG. 4 is a front elevation of the FECU and the TCU.

When the FBT 9 reaches the proper floor of the institution where the patient resides it is coupled with an FECU 26 which is similar to the KECU 25 except that it has an electrical connector 71, is connected to a transport command unit (TCU) 33, has a self-contained air chilling unit and is electrically capable of heating food. The drawing shows an FECU connected to each side of a TCU 33 since one TCU can handle two FECUs 26 and two FBTs 9. The TCU 33 receives the TMPs 7 for each FBT 9 in receptacles 35 and feeds the programmed instructions contained in the TMPs 7 for each individual heater element in the FBT into the microprocessor portion of the TCU 33. The TCU 33 automatically performs load sharing of available power within each FBT 9 to prevent drawing of power in excess of a stated maximum during nominal 32 minute heating cycle. The TCU 33 automatically turns on the rethermalization cycle for the chilled food to be heated in the FBT 9 at specific starting times manually set into a 24 hour clock which is shown in FIG. 4 and will be described later herein. The TCU also has a capability of changing the setting of one or more specific heater elements if the need arises through the program change control panel 37 (PCC). Visual means are provided to indicate certain situations and conditions regarding the operation of the units which will be explained later.

During the rethermalization cycle, the chilled foods to be served hot which are stored in dishes on the trays are heated to the desired temperature and cooked. As will be explained later, the dishes to be heated extend partially through openings in the tray and contact the raised heater elements therebelow. The foods to be served cold on the same tray are maintained in chilled condition. Chilling of the noninsulated dishes with their noninsulated lids or covers continues during the heating cycle.

Once the cycle is completed, the FBT 9 is removed from the FECU 26 after which the trays are removed and served to the patient 41. As shown in the drawing, the menu 1 is also delivered to the patient 41 and the TMP 7 is removed from the TCU 33 and replaced in the clip 6 on top of the FBT 9. After the patient has eaten, the FBT 9 along with the trays 19 are then washed, sanitized and returned to the food assembly station 15 for use again in the cycle. The TMP 7 is placed in the MTB 17 and returned to the dietary office for use in the next appropriate meal cycle as shown in the drawing.

Figure 2:
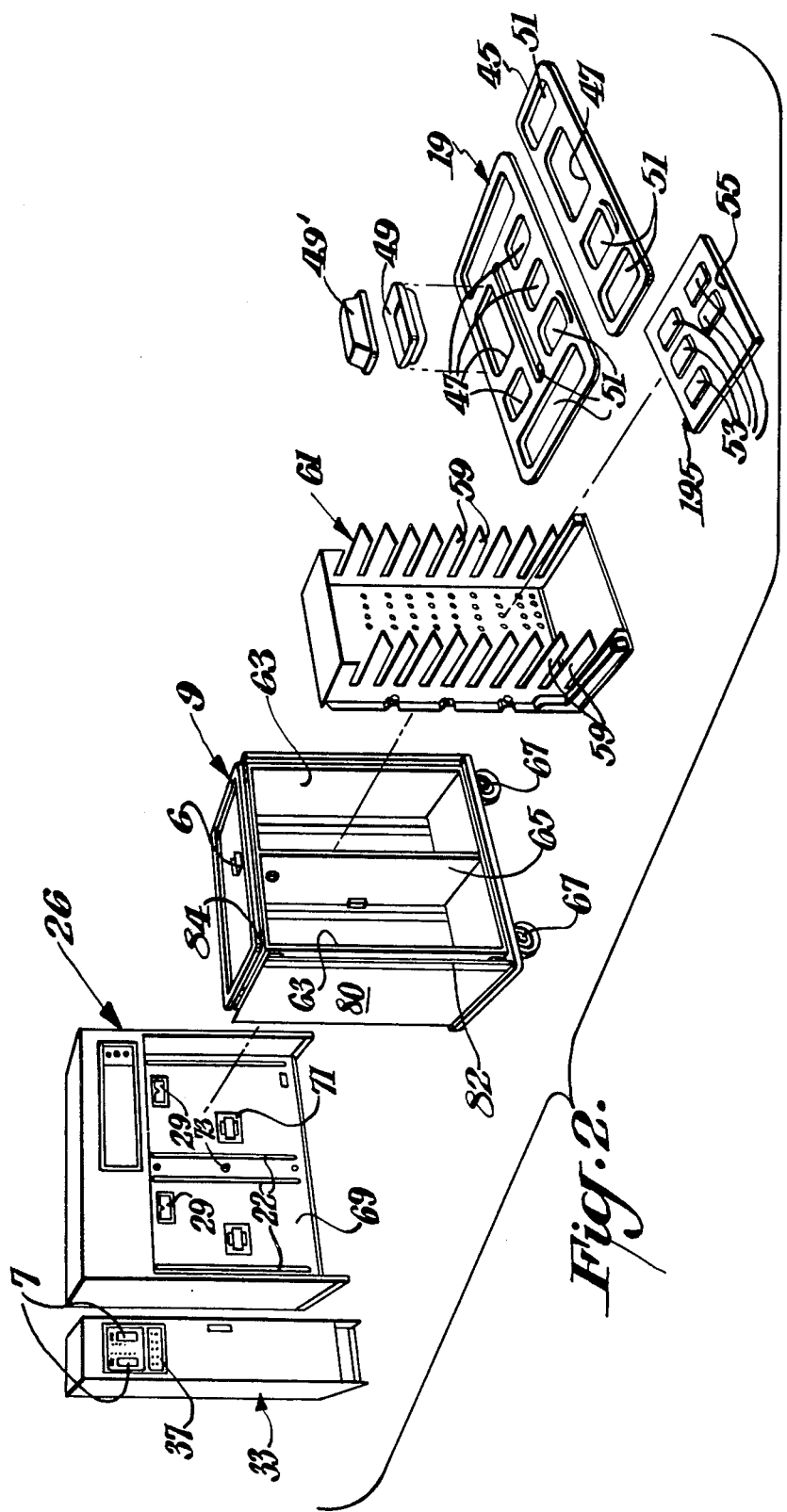
FIG. 2 is an exploded view of the main components of FIG. 1.

FIG. 2 is an exploded view of the system or assembly showing the main components of the FIG. 1 assembly. There are two types of trays which can be used with the assembly. The large general diet tray 19 accommodates full meals and the half size, modified diet tray 45 can be used for snacks, half meals and special diets. Both trays have holes or openings 47 which extend completely through the tray surface and support the dishes containing food to be heated such as the noninsulated entree dish 49 with its noninsulated cover or lid 49'. Dishes which fit in the other holes through the tray can be used for soup, cereal, bread, dessert, vegetables, fruit and the like. These dishes, with the exception of the entree dish, are interchangeable from hole to hole. Two smaller dishes can be used in place of the larger entree dish in the entree dish hole. In addition, the trays contain indents 51 in the tray surface which are used exclusively for supporting the dishes containing food to be served in chilled form. Chilled dishes may be placed in any opening 47 as long as the applicable heater elements is not programmed for heating.

When the trays 19 or 45 are supported by the heater shelf rack 61 in the FBT 9 they rest on heater shelves 55 whereby the raised heater elements 53 of the shelves 55 urge the dishes supported in the tray openings 47 out of contact with the tray since the element 53 extends above the general surface of the heating shelf 55. This eliminates any heat being transferred from the heated dishes supported by the raised heater elements 53 to the tray structure itself. Suitable wiring interconnects are supported within the heater shelf 55, the structure of which will be shown and described later (FIG. 14) and the wires gather at a terminal connector 195 of the heater shelf 55.

The heater shelves 55 are in turn supported on cantilever arm supports 59 on a heater shelf rack 61 which in turn fits within the partitions 63 of the FBT 9. Each FBT can accommodate two heater shelf racks in side by side relationship being divided by a central partition 65. As mentioned heretofore, the FBT 9 is moved upon its casters 67 into either the FECU 26 or the KECU 25 with the rear wall of the FBT interfacing and coupling with the front wall 69 of the FECU 26 or FECU 25. The description following is primarily directed to the FECU 26. The electrical power source wires for the heater shelves 55 are gathered at connector 195 and are individually interconnected to a single connector 197 (FIG. 8) at the rear wall of the heater shelf rack 61 and this connector in turn mates with connector 71 located in the front wall of the FECU 26. The outlets 27 and the inlets 29 for circulating chilled air to the FBT 9 are shown on the front wall of the FECU 26. A linear actuator 73 extending from the front wall of the FECU 26 connects with a mating socket on the back panel of the FBT 9 to automatically pull in the FBT 9 against the front wall of the FECU 26 to form a tight fit, to actuate the outlets 27 and inlets 29 and to connect the electrical connectors of the heater shelf racks 61 with the sockets 71 in the front wall of the FECU 26. The actuator and the means for operating the normally closed outlets and inlets 27 and 29 will be explained more fully hereafter. The FECU 26 is connected to the TCU 33 which when programmed by TMP 7 initiates and controls the heating and cooling cycles for the food and beverage within the FBT.

Description Of The Controls For The ECU and FBT

Figure 3:
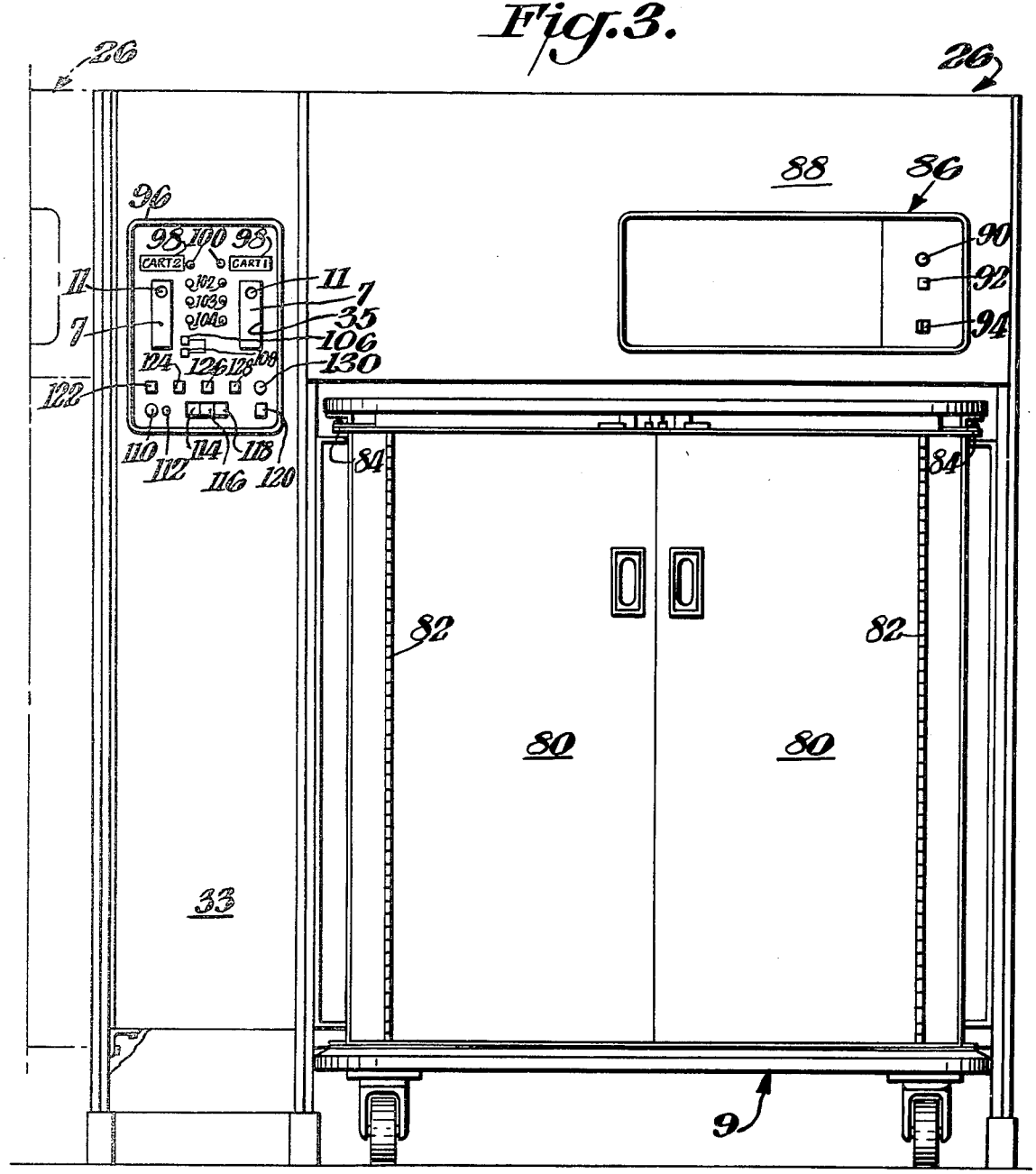
FIG. 3 is a front elevation of the FBT engaged to the FECU including the transport command unit (TCU).

FIG. 3 illustrates the FECU 26 coupled with the FBT 9. The TCU 33 which controls the operation of one or more FECUs and FBTs is also shown connected to the FECUs 26. As shown in FIG. 3, doors 80 of the FBT 9 will fold outwardly and back against the side walls of the FBT 9 by virtue of a piano hinge 82 for each door and a pivot hinge 84, likewise, for each door. Space remains between the two sections of the door and FBT walls to permit access to all surfaces of the door and FBT side walls. Such an arrangement also prevents damage to the doors since when in the open position, the ends of the doors do not extend beyond the base of the FBT.

The controls for the operation of the system are shown in both FIGS. 3 and 4 wherein FIG. 4 illustrates the FECU 26 along with the TCU 33 but without the FBT 9. Mounted on the upper part of the FECU 26 is a control panel 86 relating to the refrigeration system and the actuating means 73 for coupling the FECU 26 or KECU 25 to the FBT 9. The air chilling device 15 housed in compartment 88 located at the top of the FECU 26. It should be pointed out that instead of having its own compressor/condenser unit the compartment 88 can be connected to a remote compressor/condenser unit which would supply the liquid and suction lines to one or more KECUs 25 or FECUs 26. Signal light 90 will indicate to the attendant the fact that the chilled air has exceeded an operating temperature of 55° F. If the signal 90 is activated the unit could require services because of possible bacterial contamination within the evaporator coil and chilled air plenum chamber.

The button 92 below the signal light 90 is a reset button for signal light 90. Also included on the panel 86 is a rocker switch control 94 which pivots between two positions identified as "extend" and "retract". This button controls the operation of the actuator 73 shown in FIG. 4 which automatically couples or uncouples the FBT 9 to the FECU 26. This operation will be explained hereinafter. As seen in FIGS. 3 and 4, a TCU 33 serves to control and monitor two of the FECUs 26 as well as two FBTs 9. As shown in FIG. 4, partially in phantom, the FECUs 26 are fixed to each side of the TCU33. Affixed within the front surface of the upper portion of the TCU 33 is another control panel 96. As indicated along the panel at 98 two FBTs ("cart 1", "cart 2") are controlled from the panel. The panel 96 includes a series of signal lights wherein the signals 100 will indicate when power is being supplied to the FECUs 26. The lights 102 indicate whether or not the TMPs 7 have been accepted by TCU 33. Signal lights 103 indicate whether or not the food to be heated in the FBTs 9 has begun the rethermalization cycle. Signal lights 104 advise the attendant when the food is ready to be served.

It may be desirable to change or alter the programming for some of the heater shelves 55 in the FBTs 9 after the TMPs 7 have been prepared and inserted in the receptacles 35 of the TCU 33. Suitable controls are provided at the bottom of the control panel 96 to take care of this contingency. To effect such a change in programming the change control system is activated by key switch 110 after which a rocker switch 112 (see FIG. 4) is moved to FBT 1 or FBT 2 position to select the proper FBT 9 attached to the TCU 33. The thumbwheel switch 114 is then rotated to designate the proper heating shelf from 1 to 20 in which the time/temperature code is to be reprogrammed. Thumbwheel switch 116 is then rotated to designate the proper heated surface 53 from 1 to 5 for which the time/temperature code is to be altered. Thumbwheel switch 118 is then rotated to indicate which of the fifteen time/temperature codes is to be inserted into the TCU 33 programmer. Button 120 is depressed to enter this information into the TCU 33. One or more of the buttons positioned above the thumbwheel switches 114–116 and 118 can be depressed to feed additional specific changes desired. Button 122 sets up an early start for the food preparation (by passes the 24 hr. clock). Button 124 is depressed to cut off the power to the particular heater shelf as selected by 114. Button 126 is depressed to delay the start of the tray preparation or heating cycle as selected by 114. Button 128 is depressed if the food on the shelf selected by 114 is to be maintained warm after the cycle has been completed. Signal light 130 indicates whether or not the reprogramming instructions have been received by the TCU 33.

With the completion of the heating cycle and after buttons 126 and 128 have been depressed, LED 106 will illuminate to indicate that the delay tray is ready to be served and button 108 is then depressed when the delay tray is served thereby turning off that specific heater shelf. LED 106 is a digital indicator to identify by number the particular delay tray to be served.

The TCU 33 contains electronic components for operating the raised heater elements 53 of the heater shelves 55. Eight driver boards 140 are used to switch the function of the heater elements (described later) in heater shelves 55 on or off on command from the TMP 7 programmed micro processor unit 146. Automatic start of the rethermalization cycle for each FBT 9 is provided by a programmable sequence 24 hour clock 144. All electrical functions within the TCU 33 are protected by circuit breaker unit 142.

FIG. 4 also shows the chilled air outlets 27 for the FECU 26 as well as the chilled air inlets 29 for the FECU 26. The electrical connectors 71 which receive the electrical connectors 197 of heater shelf racks 6 within the FBT 9 to operate the heater shelves are also shown in FIGS. 4. In addition, spring supported shafts with botton heads 150 are also shown in FIG. 4. These are forced inwardly by the back of the FBT 9 moving inwardly toward the FECU 26 or KECU 25 when coupled to the FBT 9 causing the air inlets and outlets of the FECU 26 to open. This operation will be explained hereinafter.

Suitable electrical power leads connect the electronic circuit 9 and components of the TCU 33 with the electrical connectors 71 whereby the functions and operations of the food preparation in the FBTs when plugged into the connectors 71 can be controlled. A circuit breaker 72 controls the main power input for all the cooperating units. A gasket 192 extends around the perimeter of that portion of the front panel 69 of the KECU 25 and FECU 26 which mates with the perimeter of the FBT 9 to tightly seal the coupled units.

Description of Heater Shelf Rack and FBT

FIGS. 5-9 depict the heater shelf rack 61 and the manner in which it is installed in the FBT 9. FIG. 7 shows a side elevation of the heater shelf rack 61 while FIG. 8 shows a rear elevation of the heater shelf rack. As seen therein the rack 61 includes a series of vertically aligned cantilever supported heater shelf supports or arms 59 which support the heater shelves 55. As seen in FIG. 7, the cantilever arm supports 59 extend outwardly from the rear wall 175 of the rack 61 at each side thereof. Each opposing pair of arms carries a heater shelf 55. The rear wall of the heater shelf rack 61 includes vent 177 which are of greater area at the bottom of the rack but which gradually lessen in area as they extend from the bottom shelf upwardly to the top of the back panel 175. This design of the vents in the back panel 175 is important in that they provide equal flow of chilled air to be drawn off of each tray level thus eliminating stratification of the chilled air within the FBT 9. Each FBT 9 accommodates two of the heater shelf racks 61 in side-by-side relationship. The location or position of the rack 61 within the FBT 9 is assured by the alignment means as shown in FIGS. 5 and 9. Vertical legs 179 extend along each side of the shelf rack 61. Alignment pins 181 are anchored in the rear panel 183 of the FBT 9 (FIG. 9) and extend inwardly to the interior of the FBT. Alignment sockets 185 are supported by each leg 179 of the shelf rack which sockets slide over the alignment pins 181 when the rack is installed. This insures exact positioning of the heater shelf rack 61 within the FBT 9. Not only are the heater shelf racks 61 aligned in position within the FBT 9 but they are also locked in place by means shown in FIGS. 5, 7, 8 and 10. In the rear panel of the FBT there are supported threaded barrels 187 which align with each of the rails 170 of the shelf rack 61 Affixed to and extending through the rails 179 are complimentary positioned threaded thumbscrews 189 which are screwed into the barrels 187 to firmly lock the heater shelf rack 61. Affixed to and extending through the rails 179 are complimentary positioned threaded thumb screws 189 which are screwed into the barrels 187 to firmly lock the heater shelf rack 61 in position within the FBT 9.

The FBT 9 as well as the FECU 26 and the KECU 26 are formed of panels consisting of pultruded fiberglass sections 190 (see FIGS. 7, 9, 10 and 20) which are filled with suitable insulating foam material 191 such as polyurethane to form insulated panels. These sections are formed by a pultruded process which is a commercial operation wherein the panels are pulled from the extrusion device rather than being extruded. After the sections 190 are formed they are foam filled with the foam material 191 to an approximately 2#/cu.ft. density, to provide proper insulative characteristics of the finished FBT and ECU.

Each heater shelf rack 61 includes a series of electrical ribbon cables 193 connected to a circuit board connector 195 which extends from heater shelf 55 (FIG. 7). As shown better in FIG. 8 the cables 193 extend upwardly from the bottom series of heater shelves 55 and downwardly from the upper shelves 55 to be gathered at an electrical connector housing 197 positioned in the back panel 175 of the heater shelf 61 and plugged into connectors 198 within the housing 197 which when the rack 61 is installed in FBT 9 is exposed to allow mating of connectors 198 with connectors 71 of the FECU 26 or KECU 25. FIG. 6 shows the rear wall 183 of the FBT 9 which wall has suitable openings 199 therein to permit access to the electrical connectors 198 within housing 197. Electrical connector 198 has a series of contacts 198' that engage with a series of sockets 71' in connectors 71 of the FECU 26. Also shown in the back panel 183 of the FBT 9 are normally closed chilled air outlets 200 as well as the chilled air inlets 201. The female socket 74 which cooperates with the actuator head 73 is also shown.

General diet trays 19 and modified diet trays 45 are shown in various positions in FIG. 7. More will be explained about the trays and how they mate with the heater shelf at a later point herein.

Description of Serving Trays

Figure 11:
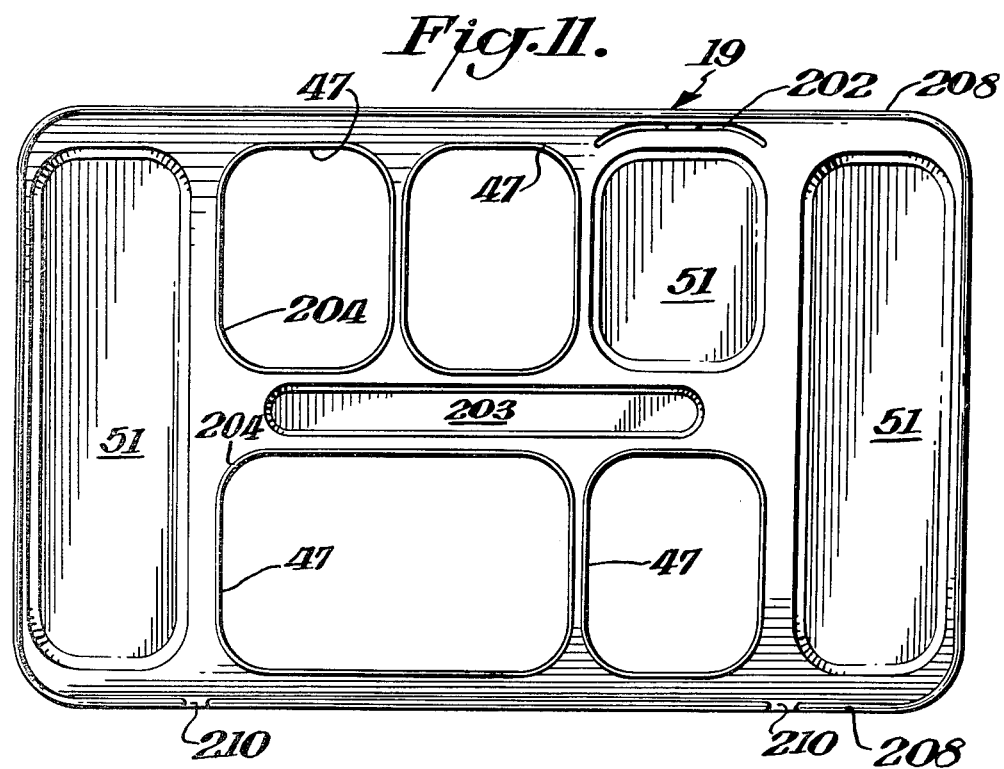
FIG. 11 is a top view of the general diet serving tray.
Figure 12:
FIG. 12 is a front elevation of the FIG. 11 tray.
Figure 13:
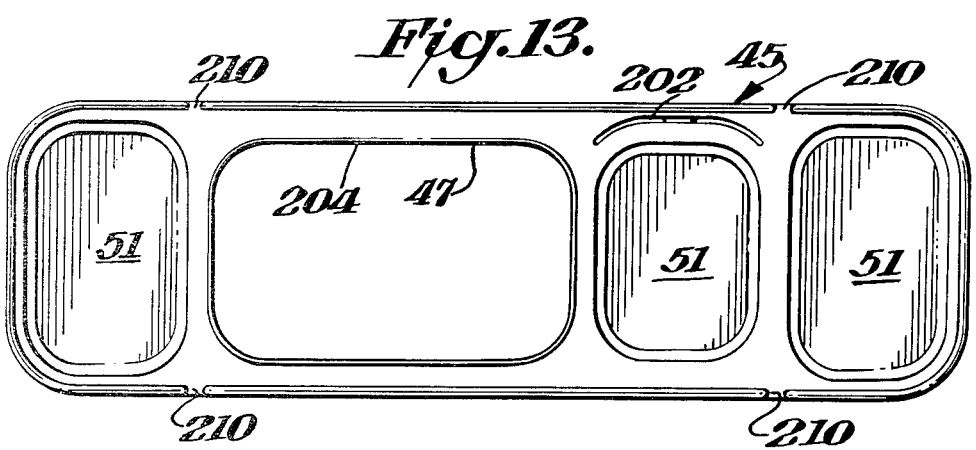
FIG. 13 is a top view of a modified diet serving tray which can also be used with the present invention.

The general diet tray 19 is shown in FIGS. 11 and 12 while the modified diet tray 45 is depicted in FIG. 13. The general diet tray 19 as well as the modified diet tray 45 are formed preferably of a suitable plastic material such as polycarbonate and are light in weight. The tray 19 includes a slot 202 in which the menu 1 for the particular meal being served can be inserted while the elongated indent 203 in the tray supports napkins and tableware. The tray indents 51 are used to support dishes containing food items which are to be served cold such as salads and desserts as well as glasses, cups, condiments, milk cartons, and the like. The dish supports 47 consist of holes or openings extending through the surface of the tray with a raised bead 204 extending around the periphery of the dish support 47 for supporting the dish as will be explained later. Of course, the tray openings 47 can also be used for dishes containing food to be served cold by not programming the heating cycle for the particular raised heated surface 53 underlying the tray opening 47 to be heated during the food preparation cycle.

The modified diet tray 45 shown in FIG. 13 has the similar dish indents 51 and dish openings 47 as with the FIG. 11 tray.

Tray 19 also has a raised bead 208 which extends around the tray periphery and in the leading edge side of the tray there are two notches 210 in the raised bead which serve as guides when inserting the tray in the heater shelf rack 61. These notches 210 are also shown in FIG. 12. The operation of these guiding notches will be explained further after the heater shelf 55 itself has been more fully described. The modified diet tray 45 also has notches 210 however here they exist in alignment in both the leading and trailing edge sides of the tray.

Description of Heater Shelf

FIGS. 14-17 illustrate the heater shelf 55 used with the present invention. As seen therein, there is provided a frame F, a lower panel 225, an upper panel 227 and a honeycombed layer 256 between the upper and lower panels. The lower panel 225 is formed of fiberglass, stainless steel, or the like. The upper heater panel 227 is formed of stainless steel and incorporates strategically spaced holes 260 for raised elements 53 which locate etched resistive film heaters 262 which are secured to raised element 53 and the edge 261 of the spaced holes 260 of panel 227 by bonding with silicone rubber 263. The film heaters supply heat to the raised heater elements 53. The film heaters 262 are wired electrically to the inward extension of printed circuit connector 195. The printed circuit board 195 is secured to the heater shelf frame F at the upper right hand corner as shown in FIG. 14.

As further shown in FIGS. 14-17, the heater shelf frame F has vertically extending edges 250 which extend upwardly and vertically extending edges 251 which extend downward. The upper surface of Frame F has a peripheral groove 252 and the lower surface of Frame F has an inwardly extending peripheral flange 253. The upper heater shelf panel 227 fits over the heater shelf frame F and its skirted edges 254 extend downwardly to fit within the peripheral groove 252 of the heater shelf frame F and the edges 254 are bonded in place with a polysulphide adhesive 255. The lower heater shelf panel 225 fits within the heater shelf frame F and its skirted edges 257 are crimped as shown in FIG. 17 to fit within the opening 258 of the heater shelf frame F and come to rest upon peripheral flange 253. The edges 257 of lower panel 225 are bonded to the frame with a polysulphide adhesive 255. Sandwiched between the upper heater shelf panel 227 and the lower heater shelf panel 225 in those areas not occupied by the heater elements 262 is a honeycombed aluminum or nomex filler layer 256 as shown in the upper left-hand corner of FIG. 14. This gives structural strength to the heater shelf 55, providing lateral shear strength into both the upper shelf panel 227 and the lower heater shelf panel 225, when bonded into place using a polysulphide film adhesive 259.

Although the power wiring hookup is only shown with respect to the two film heater units 262 appearing at the top of FIG. 14, the same connection is used with the remaining three raised heater elements 53 shown in FIG. 14. The wiring as mentioned before for these raised heater elements travels through the wiring paths 233 cut or formed in the honeycomb structure 256.

The raised heater elements 53 are sheet stainless steel, of a thickness to remain rigid during the heating and cooling temperatures imposed on the heater shelves 55 when used in the FBT 9. The raised elements 53 are adhered by silicon adhesive 263 to the back side of the upper heater shelf panel 227 to cover the openings 260. The lower element of raised heater surface 53 has an etched resistive film heater 262 sandwiched between silicone pads 264 bonded in place.

As shown in the lower portion of FIG. 14, power is supplied to the film heater units 262 by wire leads 265 which are secured to an edge of the silicone pad 264 on the bottom of the heater element as at 266. The ends of the leads are covered with a strip 267 of the same silicone material as used in pads 261 which covers the bottom of the heater unit 262.

Tray Guide Description

The heater shelf frame F also includes tray guide ledges 275 at opposite sides of the panel shown in FIGS. 14 and 15. The ledges include indents 277 and 279 located at the middle of the ledge and at the trailing edge of the ledge 275 respectively. As shown better in FIGS. 18 and 19 a short rib element 281 is located on the bottom surface of the tray 19 just inwardly of each elongated dish indent 51 of the tray and approximately at the middle point of the elongated indents 51. (Also see FIG 11). FIG. 11 also shows the cutouts 210 in the leading edge of the tray 19. The attendant places the tray 19 on the heater shelf 55 with the cutouts 210 in the border of the tray 19 (also see FIG. 7). Immediately under the lower edge of the cantilever heater shelf support 59 which is so spaced from the lower heater shelf 55 that the tray becomes positioned between the two so that the lower edge of the cantilever support 59 will stay within the cutouts 210 of the tray along the leading edge of the tray thus forming a track for the tray as it is slid inwardly of the heater shelf 55. When the rib 281 reaches the middle indent 277 in the ledge guide 275 of the heater shelf it drops down into the indent thus positioning it in place and freeing the tray from the lower edge of the above positioned cantilever shelf support 59. This is shown in phantom in FIG. 19. The trailing edge of the tray 19 also has a downwarly extending rib 290 (FIG. 15) which drops into the indent 279 at the trailing edge thereof. The trays 19 can be withdrawn from their fully inserted position on the heater shelf 55 to a halfway inserted position with the rib 290 dropping into indent 277 of heater shelf 55 and the cutout 210 engaging the lower edge of the cantilever supported arms 59 whereby the tray 19 is anchored to prevent it from falling onto the floor. This arrangement permits one to pour beverages into the cups.

With the above arrangement the trays are insured of correct positioning with respect to the raised heater elements 53 when they are positioned or seated on the heater shelves 55 (see FIG. 7).

The modified diet trays 45 operate in the same manner except that the ribs 281 extend vertically downwardly from the underside of each longitudinal or elongated side of the tray. Cutouts 210 as noted in FIG. 13 in the upper border of the elongated sides of the tray are found on both sides of the tray instead of just the leading edge side as with the general diet tray 19.

Chilled Air Circulation Control

FIGS. 20-24 illustrate the extendable-retractable frame 300 which controls the opening and closing of the circulating air intake vents 29 and the air discharge openings 27 in the KECU 25 and the FECU 26 as well as the air inlets 200 and the air discharge vents 201 of the FBT 9. The frame 300 is located just behind the front panel 69 on spring loaded slidable shafts 304 attached to the frame 300 and supported in bearing mounts 306 supported in the FECU front panel 69. The end of each shaft extending externally of the FECU front panel 69 is capped by a button 150. As shown in FIGS. 22–22, there are two shafts 304 located one above the other at the top and bottom of the FECU front panel 69, each having a push button 150 protruding externally from the FECU front panel 69.

Figure 21:
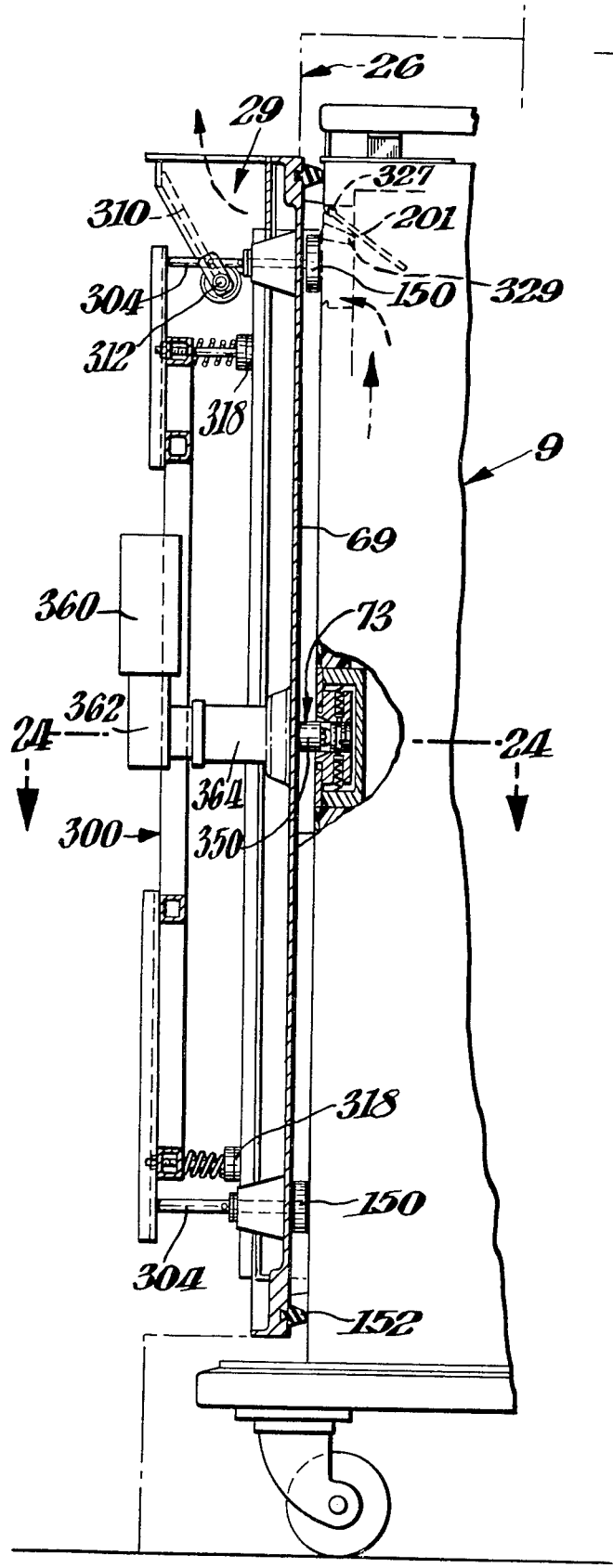
FIG. 21 is a side elevation in section illustrating the FBT coupled to the ECU.
Figures 23, 24:
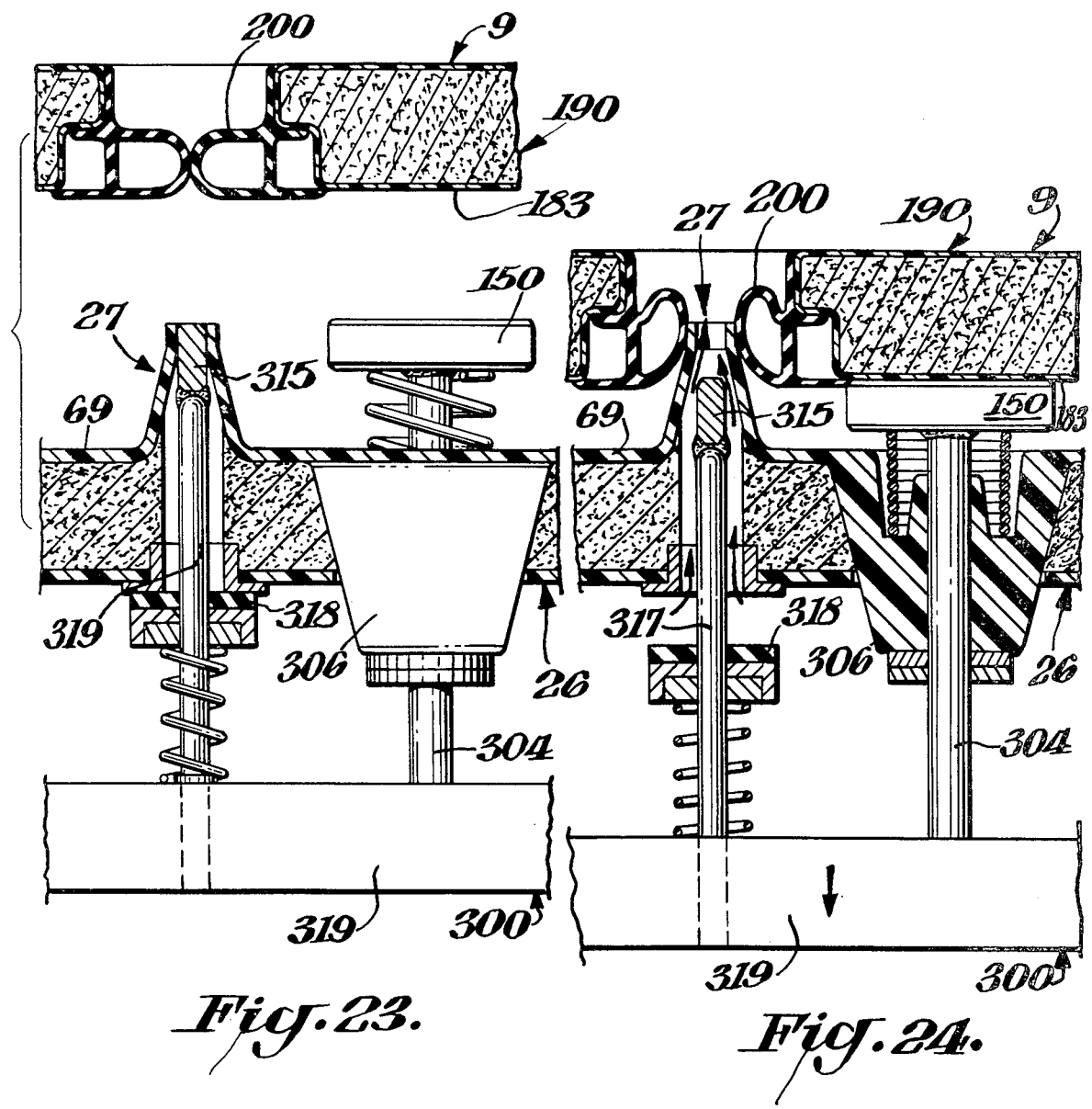
FIG. 23 is a section illustrating the refrigerated air outlet for the ECU with the FBT in uncoupled position.
FIG. 24 is a section illustrating the units of FIG. 23 in coupled position.

FIG. 23 shows the shaft 304 in the extended position as when the FECU 26 is in uncoupled relationship with the FBT 9 with the frame 300 in the forward position. FIGS. 21 and 24 show the buttons 150 urged inwardly by the back panel 183 of the FBT 9 which moves the shafts 304 away from the front panel 69 of the FECU 26 which in turn urges the frame 300 to its retracted position away from the front panel 69 as also shown in FIG. 21.

The inlets 29 (FIGS. 21, 22) of the FECU 26 for circulating chilled air are opened by the retraction of the frame 300 by pivoting open the doors 310 which are linked to the upper shaft 304 through linkable means 312 (FIGS. 21, 22). As the shafts 304 are retracted, the doors 310 pivot at the bottom backwardly out of the normal closed position to the open position (FIGS. 20–22).

The retraction of the frame 300 as the FECU 26 and FBT 9 become coupled also opens the vertical air inlets 200 for the FBT 9. As shown in FIGS. 23 and 24, the vertical air outlets 27 in the front panel of the FECU 26 spread the lips of the flexible vertical air seals 200 on the back panel of the FBT 9 as the FBT 9 is coupled to the FECU 26 or KECU 25. At the same time a plug 315 which fills the vertical air outlet 27 in the FECU 26 is moved backwardly to open the outlet 27. The plug 315 is affixed to a springed loaded extendable and retractable shaft 317 and in turn secured to the horizontal arms 319 (FIG. 22) of the frame 300. As the buttons 150 retract, the frame 300 retracts the shaft 317, seal member 318 and plug 315 to their open position as shown in FIG. 24 to permit chilled air to pass from the FECU 26 into the FBT 9 through flexible vertical seal 200.

Also, the outlets 201 for the circulating chilled air located in the rear panel of the FBT 9 (see FIGS. 6 and 20) are moved to the open position during the coupling of the FBT 9 to the FECU 26. As shown in FIGS. 6 and 20, the outlets 21 are normally closed by free swinging doors 202 pivoted at points 327. Fixed fingers 329 located just above outlet 29 of the FECU 26 contact the doors 202 during the coupling of the FECU 26 to the FBT 9 to urge or push the doors 202 inwardly within the FBT 9 to the open position as shown in FIG. 21 and 26.

Wtih the above arrangement, cold air is circulated from the FECU 26 through the FBT 9 amd then back into the FECU 26 in a closed loop pattern which will be better illustrated later.

Coupling Mechanism

As shown in FIGS. 20–22 and FIGS. 21A and B, an extendable- retractable linear actuator assembly 73 is connected with the FECU 26 and extends through the front panel 69 of the FECU. The actuator assembly 73 couples the FBT 9 tightly up against the front panel 69 of the FECU. As shown better in FIG. 20, the assembly 73 includes an actuator crank 350 having a head 352 with a circumferential groove 354 with a stop pin 356 extending vertically from the base of the groove. Leading into the circumferential groove 354 from the free end of the head 352 are a pair of diametrically opposed axial grooves 358. The actuator crank 350 is extended and retracted through the drive motor 360, gear box 362 and slip clutch 364. The retraction and extension is achieved through a worm gear arrangement which also rotates the actuator crank 350. The crank 350 will extend about three inches beyond its fully retracted position and the retraction and extension of the crank can be manually controlled by switch 94 mounted on the control panel 86 of the FECU 26, or automatically by the insertion of the TMP 7 into the TCU 33 front panel receptacle 35.

Supported in the back panel of the FBT 9 is a female socket 74. The female socket 74 includes a pair of diametrically opposed spring loaded pins 370 which extend into the barrel of the female socket assembly 74.

In practice, the FBT 9 is moved into position so that the back panel of the FBT 9 lies within 3 inches of the front panel of the FECU. The switch 94 on the panel 86 of the FECU 26 is then moved to the extend position and the actuator crank 350 extends outwardly from its retracted position about three inches. Since the back panel of the FBT 9 is positioned within three inches of the FECU front panel the head 352 of the crank 350 enters the female socket 74 and the spring loaded pins slide into the axial grooves 358 of the head 352 until they become lodged in the circumferential groove 354 of the head 352. At this point, the head rotates to lock the pins 370 in the circumferential groove 354 and the rotation continues until one of the pins hits the vertically disposed stop pin 356 in the circumferential groove 352 as shown in FIG. 21B. The switch 94 is then moved to the retract position and the crank 350 retracts to pull the FBT 9 inwardly tightly up against the front panel of the FECU which also compresses sealing gasket 152 to form a tight seal between the coupled units. Alternatively, if the switch 94 is not actuated, the TCU 33 will automatically instruct the crank 350 to retract after a 30 second lapse in time. The FBT 9 and the FECU are now in coupled position and the circulation of the chilled air initiates from the FECU through the FBT 9 and back to the FECU in a continuous closed loop pattern to keep the food items stored in the FBT at 40° F.±5°.

Circulation Pattern for Chilled Air

To illustrate the circulating pattern of the chilled air in the system of the present invention, a schematic of the uncoupled FECU 26 is shown in FIG. 25 while FIG. 26 illustrates the air pattern assumed through the FECU and the FBT 9 when coupled together. As seen in FIG. 25 the chilled air travels from the evaporator section of the chilled air unit 88 of the FECU 26 downwardly through opening 400 defined by the rear wall 402 of the FECU and the partition 404 whereupon it passes into compartment 406 descending into the FECU plenum chamber 406. It is then drawn off as indicated by the arrows in FIG. 25 to return to the chilled air unit 88 through opening 408 defined by the front panel 302 of the FECU and the partition 404. In the uncoupled position, the FECU air inlet doors 310 and the air inlets 27 are closed whereby chilled air is circulated through the FECU continuously in the closed loop pattern described above before being coupled with an FBT 9.

FIGS. 26 and 27 depict the FBT 9 coupled to the FECU with the air inlets and outlets of both the FBT 9 and the FECU being the open position as explained previously herein. Here the chilled air passes into the FBT 9 to travel along the sides of the heater shelf rack 61, forward to the front of the heater shelf rack arms 59 and, as better shown in FIG. 27, back over the trays 19 or 45, through vents 177 in the rear of the heater shelf rack and then out of the FBT 9 through the outlet ports 201 controlled by doors 310. From this point they are returned to the chilled air unit 88 through inlet 408 and then recycled into the FECU and FBT in the continuous loop pattern described above with the air being reconditioned by the air chilling apparatus in compartment 88 of the FECU 26.

As is clear from the drawings the chilled air is uniformly distributed over the heater shelves 55 and the trays 19 or 45 supported thereon to chill all the food items on the many trays in a uniform manner.

Because the dishes being heated and their covers or lids are noninsulated, loss of nutritional values of the food being heated is minimal. This is explained by the fact that the dishes being heated are simultaneously exposed to the continuous flow of chilled air which tends to cool the dish and cover surfaces and returns moisture lost in cooking back into the food product, and at the same time tempers the rate at which the food is cooked. The total effect is somewhat akin to low pressure steam cooking.

What is claimed is:

1. Apparatus for preparing meals for hospitals, airlines and the like comprising a food and beverage cabinet having access doors and a back panel, a rack having heater shelves in said cabinet which support food trays, spaced individual heater surfaces supported by said shelves, air inlet means in said back panel of said cabinet, air outlet means in said back panel of said cabinet, an environmental control unit in the form of a housing having a plenum chamber and a front panel therefor disposed toward said back panel of said cabinet, normally closed air outlet means in said front panel of said plenum chamber, normally closed air inlet means in the said front panel of said plenum chamber, means for circulating chilled air in a first closed loop pattern in said environmental control unit through said plenum chamber when its said inlet means and outlet means are closed, means for coupling said environmental control unit to said food and beverage cabinet so that said back panel of said cabinet is flush with said front panel of said plenum chamber in sealed relationship therewith, said outlet means of said plenum chamber mating with said inlet means of said cabinet and said outlet means of said cabinet mating with said inlet means of said plenum chamber when said cabinet and said environmental control unit are coupled together, means supported by said environmental control unit for opening said outlet means and said inlet means of said cabinet and of said plenum chamber when said environmental control unit and said cabinet are being coupled together whereby chilled air is continuously circulated through the coupled cabinet and said plenum chamber in a second closed loop pattern which is larger than and includes said first closed loop pattern, and means connected with said heater shelves for heating said spaced heater surfaces on said shelves.

2. The apparatus of claim 1 wherein said means for heating said heater surfaces includes a transport module pack having programmed instructions in the form of time/temperature curves for each of said heater surfaces, a transport command unit mounted to said environmental control unit and connected to said heater surfaces, said transport command unit being computerized and having means for connection with said transport module pack, and said computerized transport command unit being programmed by said transport module pack upon connection therewith whereby each of said heater surfaces is heated in accordance with its time/temperature curve.

3. The apparatus of claim 2 wherein the means for controlling the time and amount of electrical current input applied to said heater surfaces of the heater shelves comprises a receptacle for receiving memory instructions, and electronic controls for transmitting the programmed instructions through said plenum chamber and the cabinet to said heating means for said spaced surfaces of the heater shelves.

4. The apparatus of claim 2 wherein electrical power supply leads extend from said heater surfaces of the heater shelves to a common printed circuit connector which extends through each heater shelf and connects to wire cables leading to a common electrical connector on the back panel of said heater shelf rack extending through an opening in said back panel of said food and beverage cabinet, said heater shelf rack common connector being connected to an electrical connector in said front panel of said plenum chamber when said cabinet and plenum chamber are coupled, and said connector in said front panel of said plenum chamber being connected through electrical leads to said transport command unit.

5. The apparatus of claim 4 wherein each heater shelf is supported by cantilever arm supports of said heater shelf rack positioned within said food and beverage cabinet.

6. The apparatus of claim 5 wherein the heater shelf rack has a back wall with vents to permit controlled circulation of chilled air therethrough.

7. The apparatus of claim 5 wherein said heater shelf rack is detachably mounted within said food-beverage cabinet.

8. The apparatus of claim 2 wherein means are provided for reprogramming said transport command unit for controlling the time and amount of electrical current after it has once been programmed by said transport module pack.

9. The apparatus of claim 2 wherein said transport module pack includes an entry console for transmitting data to a memory module, said module including a memory chip and a power source for maintaining the information fed from said entry console.

10. The apparatus of claim 9 including manual time delay means for delaying the start of said heating, and means for manually reprogramming said transport command unit.

11. The apparatus of claim 1 wherein said food and beverage cabinet is portable.

12. The apparatus of claim 1 wherein said plenum chamber includes an extendable and retractable frame, control means for said frame at said front panel of said chamber which when contacted by said back panel of said food and beverage cabinet during coupling of said cabinet to said plenum chamber causes said frame to retract inwardly of the plenum chamber, said frame being connected to means for opening said air outlet means and air inlet means of said plenum chamber and said air inlet means of said food and beverage cabinet, and means affixed to said front panel of said plenum chamber for urging open said air outlet means of said food and beverage cabinet.

13. The apparatus of claim 1 wherein said environmental control unit includes an air chilling device compartment disposed above said plenum chamber through which compartment and said plenum chamber chilled air continuously circulates in said first closed loop pattern prior to coupling said plenum chamber with the food-beverage cabinet, an inlet and outlet of said air chilling device compartment being in the form of apertures in the floor of said compartment, a partition vertically positioned in the upper portion of said plenum chamber forming a path on each side thereof whereby the chilled air circulates downwardly from said compartment on one side of the partition to the bottom of said plenum chamber and up said plenum chamber past the opposite side of said partition back into said compartment.

14. The apparatus of claim 13 wherein said outlet means of said plenum chamber comprise vertical slots in said front wall of said plenum chamber disposed toward said food and beverage cabinet and provide an outlet of the circulating chilled air in said plenum chamber into said food and beverage cabinet when said slots are opened by the coupling action of said cabinet to said plenum chamber, said vertical slots extending substantially the entire length of said front wall panel of said plenum chamber and terminating adjacent the bottom thereof, and said inlet means of said plenum chamber comprising an air inlet opening being disposed in the upper portion of said front wall of said plenum chamber to receive the return circulating air from said cabinet.

15. The apparatus of claim 14 wherein said environmental control unit is without heating means, a plurality of said plenum chambers being positioned adjacent one another, said plenum chambers being collectively connected with a common means for providing chilled circulating air, and each of said plenum chambers having a separate set of chilled air inlets and outlets communicating with corresponding inlet means and outlet means of said food and beverage cabinets.

16. The apparatus of claim 1 wherein each of said plenum chamber and said cabinet is made from insulated panels formed by pultruded means having foamed insulative material between said panels.

17. Apparatus for preparing meals for hospitals, airlines and the like comprising a food and beverage cabinet having access doors and a back panel, a rack in said cabinet having heater shelves for supporting food trays, heater surfaces on each heater shelf, air inlet means in said back panel of said cabinet, air outlet means in said back panel of said cabinet, an environmental control unit in the form of a housing having a plenum chamber and a front panel therefor, a chilled air source in said environmental control unit communicating with said plenum chamber, normally closed air outlet means in said front panel of said plenum chamber, normally closed air inlet means in said front panel of said plenum chamber, means for coupling said cabinet to said plenum chamber and opening communication between their inlet and outlet means whereby chilled air may flow from said plenum chamber and through said cabinet and back to said plenum chamber in a closed loop pattern for continuously circulating chilled air over the food containing dishes on the food trays, and heating means connected to said heater surfaces for heating each heater surface to a temperature and for an amount of time independently of all other heater surfaces.

18. The apparatus of claim 17 wherein said plenum chamber is located at the rear of said environmental control unit housing, said environmental control unit housing being open at its front face forming a cabinet receiving chamber therein to permit said food and beverage cabinet to be inserted into said cabinet receiving chamber, a computerized transport command unit at the front of said environmental control unit, a transport module pack inserted in said transport command unit, and said transport module pack containing programmed instructions for said heater surfaces and controlling said time/temperature curve of each heater surface.

19. The apparatus of claim 18 wherein said environmental control unit housing includes a plurality of said cabinet receiving chambers, one of said food and beverage cabinets being in each of said cabinet receiving chambers, and said transport command unit having a transport module pack for each of said food and beverage cabinets.

20. The apparatus of claim 19 wherein said environmental control unit housing includes a source of chilled air common to each plenum chamber associated with each food and beverage cabinet.

21. Apparatus for preparing meals for hospitals, airlines and the like comprising a food and beverage cabinet having heater shelves for supporting food trays, at least one heater surface on each shelf, means for heating the heater surfaces, air inlet means in said back panel of said cabinet, air outlet means in said back panel of said cabinet, an environmental control unit in the form of a housing having a plenum chamber and a front panel therefor, a chilled air source in said environmental control unit communicating with said plenum chamber, air outlet means in said front panel of said plenum chamber, air inlet means in said front panel of said plenum chamber, means for coupling said cabinet to said environmental control unit and opening communication between said inlet and outlet means of said cabinet and said plenum chamber whereby chilled air may flow from said plenum chamber and through said cabinet and back to said plenum chamber in a closed loop pattern for continuously circulating chilled air over the food containing dishes on the food trays, said rack having a back wall disposed inwardly of and adjacent to said back panel of said cabinet, said rack including sets of pairs of vertically aligned support arms extending from said back wall, said heater surfaces being disposed laterally within the spacing between said sets of support arms, said plenum chamber outlet means comprising vertical slots in its said front panel laterally outside the spacing of said sets of support arms, said cabinet inlet means comprising vertical slots in its back panel disposed for communication with said plenum chamber vertical slots, said cabinet outlet means comprising an opening at the upper end of its said back panel laterally within the spacing of said sets of support arms, said inlet means of said plenum chamber being an opening in its said front panel disposed for communication with said outlet opening of said cabinet, said back wall of said rack having outlet openings between each set of said sets of support arms whereby chilled air flows from said plenum chamber into said cabinet laterally outside said support arms toward the front of said cabinet and over said trays and through said rack back wall openings and then exits through said cabinet outlet means into said chamber inlet means, and the flow area of said rack back wall openings gradually lessening from the bottom to the top of said rack.

22. The apparatus of claim 21 wherein said support arms are cantilevered with side portions extending downwardly toward and generally adjacent the support arms therebelow at the rear of said cabinet to provide baffles directing the air flowing outwardly thereof toward the front of said cabinet.

23. The apparatus of claim 21 wherein vertical extensions project outwardly from said back wall of said rack in line with said support arms and toward said back panel of said cabinet to vertically separate the spacing laterally between said arms from the spacing outside said arms.

24. The apparatus of claim 21 wherein said air inlet means and said air outlet means of said plenum chamber are normally closed to circulate the chilled air therein in a closed loop pattern before said plenum chamber is coupled to said cabinet.

25. The apparatus of claim 21 wherein said means for heating said heater surfaces heats each of said surfaces for amounts of time and to temperatures independently of each other of said surfaces.

26. A system for preparing meals for hospitals, airlines and the like comprising, in combination, a first environmental control unit including a plenum chamber having a front panel with air inlet means and outlet means and having a source of chilled air communicating therewith, a food and beverage transport in the form of a cabinet having access doors and a back panel, said cabinet including a rack having heater shelves which support food trays, at least one heater surface on each of said shelves with heater means for heating said heater surfaces, air inlet means and air outlet means in said back panel of said cabinet for communicating with said air outlet means and said air inlet means of said first environment control unit, means for coupling said cabinet to said environmental control unit whereby chilled air may flow in a closed loop pattern from said plenum chamber into said cabinet over said trays and back to said plenum chamber, a second environmental control unit, said second environmental control unit including a plenum chamber having a front panel with air inlet means and outlet means and a source of chilled air communicating therewith whereby said cabinet may be uncoupled from said first environmental control unit and then coupled to said second environmental control unit so that chilled air may likewise flow through a closed loop pattern therewith, and said second environmental control unit further including heat control means connectable to said heater means in said cabinet whereby said heater surfaces may be heated simultaneously with the flowing of chilled air in the closed loop pattern when said cabinet is coupled to said second environmental control unit.

27. The system of claim 26 including a memory pack having time/temperature control curve information corresponding to the amounts of time and to the temperature at which each heater surface is to be heated, and said memory pack being connectable to said heat control means of said second environmental control unit for thereby controlling the time and temperature of heating of each heater surface.

28. The system of claim 26 wherein each of said environmental control units is capable of having a plurality of food and beverage transports simultaneously coupled thereto, and each of said units having a corresponding plurality of said plenum chambers with a single source of chilled air for said plurality of plenum chambers.

29. The system of claim 26 wherein said inlet means and said outlet means of each of said environmental control unit are normally closed, and the chilled air in each of its plenum chambers flowing in a closed loop pattern through its plenum chamber when a food and beverage transport is not yet coupled thereto whereby upon the coupling of a food and beverage transport to a respective environmental control unit chilled air immediately flows into said food and beverage transport.

30. The system of claim 26 wherein said food and beverage cabinet rack includes a back wall having sets of pairs of vertically aligned support arms extending therefrom, each heater shelf being mounted to a respective set of said support arms, said back wall of said rack having discharge openings located between each set of said support arms, and the flow area of said back wall discharge openings gradually lessening from the bottom to the top of said rack.

31. The system of claim 30 wherein said outlet means of each environmental control unit comprises elongated vertical slots disposed laterally outside of the spacing between said sets of support arms, said inlet means of said cabinet being elongated vertical slots laterally outside of the spacing between said sets of support arms for flow communication with said outlet means of its environmental control unit, said back wall of said rack being disposed in front of and adjacent to said back panel of said cabinet, said outlet means of said cabinet being an opening in the top portion of said back panel, and said inlet means of each environmental control unit being an opening in its front panel disposed for flow communication with said outlet opening of said cabinet.

32. The system of claim 31 wherein said support arms are cantilevered, each of said support arms having downwardly extending side surfaces disposed toward and adjacent to the support arms thereunder, said trays straddling said support arms, and vertical extensions projecting from said back wall of said rack generally in line with said support arms and extending toward said back panel of said cabinet.

33. The system of claim 31 wherein said means for coupling said cabinet to a respective one of said environmental control unit includes means for automatically opening said inlet means and said outlet means of said environmental control unit upon the coupling action of said cabinet thereto.

* * * * *

UNITED STATES PATENT OFFICE
CERTIFICATE OF CORRECTION

Patent No. 4,203,486  Dated May 20, 1980

Inventor(s) Harry A. Rubbright

It is certified that error appears in the above-identified patent and that said Letters Patent are hereby corrected as shown below:

The title of the invention on the cover page and in column 1 should read "FOOD PREPARATION APPARATUS".

Column 4, line 67, "questionanswer" should read -- question answer --.

Column 5, line 35, after "9" insert -- . --.

Column 7, line 13, "FECU" (second occurrence) should read -- KECU --.

Column 7, line 59, after "88" insert -- is --.

Column 9, line 12, "FIGS." should read -- FIG. --.

Column 9, line 25, "192" should read -- 152 --.

Column 9, line 42, "vent" should read -- vents --.

Column 9, lines 65-68, delete "Affixed to ... rack 61".

Column 10, line 5, "26" (second occurrence) should read -- 25 --.

Column 12, line 2, "element" should read -- surface --.

Column 12, line 2, "surface" should read -- element --.

Column 12, line 39, "downwarly" should read -- downwardly --.

Column 13, line 5, "22-22" should read -- 20-22 --.

UNITED STATES PATENT OFFICE
CERTIFICATE OF CORRECTION

Patent No. 4,203,486         Dated May 20, 1980

Inventor(s) Harry A. Rubbright

It is certified that error appears in the above-identified patent and that said Letters Patent are hereby corrected as shown below:

Column 13, line 51, "FIG." should read -- FIGS. --.

Column 13, line 53, "Wtih" should read -- With --.

Column 13, line 54, "amd" should read -- and --.

Patent claim 10, line 2, after "heating" insert -- means --.

Signed and Sealed this

Nineteenth Day of August 1980

[SEAL]

Attest:

SIDNEY A. DIAMOND

Attesting Officer

Commissioner of Patents and Trademarks